(12) United States Patent
Kwon et al.

(10) Patent No.: US 9,860,573 B2
(45) Date of Patent: Jan. 2, 2018

(54) METHOD AND APPARATUS FOR PROVIDING AND RECEIVING DATA

(75) Inventors: O-hoon Kwon, Suwon-si (KR); Ho-jin Ha, Suwon-si (KR); Guanhua Zhang, Suwon-si (KR); Hyung-tak Choi, Suwon-si (KR); Sun-bal Kim, Suwon-si (KR); Ji-eun Keum, Suwon-si (KR); Sung-bin Im, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 264 days.

(21) Appl. No.: 12/946,220

(22) Filed: Nov. 15, 2010

(65) Prior Publication Data

US 2011/0125919 A1 May 26, 2011

Related U.S. Application Data

(60) Provisional application No. 61/260,906, filed on Nov. 13, 2009, provisional application No. 61/310,921, filed on Mar. 5, 2010.

(30) Foreign Application Priority Data

Oct. 22, 2010 (KR) ........................ 10-2010-0103726

(51) Int. Cl.
*G06F 15/16* (2006.01)
*H04N 21/2343* (2011.01)
(Continued)

(52) U.S. Cl.
CPC ... *H04N 21/23439* (2013.01); *H04L 65/4084* (2013.01); *H04L 65/4092* (2013.01);
(Continued)

(58) Field of Classification Search
CPC .............. H04N 21/4305; H04L 65/608; H04L 65/4084; H04L 65/607; H04L 65/601; H04L 65/60
See application file for complete search history.

(56) References Cited

U.S. PATENT DOCUMENTS 5,784,528 A 7/1998 Yamane et al.
6,851,091 B1 2/2005 Honda et al.
(Continued)

FOREIGN PATENT DOCUMENTS

CN 1290895 A 4/2001
CN 1459066 A 11/2003
(Continued)

OTHER PUBLICATIONS

NPL—Reloading the page (Mar. 22, 2005), hereinafter Reloading the page, (pp. 1-2), Author: Joe Burns, HTML Goodies website: <http://htmlgoodies.com/tutorials/getting_started/article.php/3479551>.*

(Continued)

*Primary Examiner* — David Lazaro
(74) *Attorney, Agent, or Firm* — Sughrue Mion, PLLC

(57) ABSTRACT

Provided are a method and apparatus for receiving and providing data. The method of receiving data includes: receiving first information including information about a first interval of a plurality of media data generated by encoding content in different qualities; acquiring renewal time information indicating a point of time for a first file to be renewed by using the first information; and receiving second information comprising information about a second interval of the plurality of media data based on the renewal time information.

8 Claims, 33 Drawing Sheets

(51) Int. Cl.
| | |
|---|---|
| *H04L 29/06* | (2006.01) |
| *H04N 21/235* | (2011.01) |
| *H04N 21/2362* | (2011.01) |
| *H04N 21/24* | (2011.01) |
| *H04N 21/658* | (2011.01) |
| *H04N 21/81* | (2011.01) |
| *H04N 21/845* | (2011.01) |

(52) U.S. Cl.
CPC ....... *H04L 65/608* (2013.01); *H04N 21/2353* (2013.01); *H04N 21/2362* (2013.01); *H04N 21/2402* (2013.01); *H04N 21/6581* (2013.01); *H04N 21/812* (2013.01); *H04N 21/8456* (2013.01)

(56) References Cited

U.S. PATENT DOCUMENTS

| | | | |
|---|---|---|---|
| 6,895,410 B2 | 5/2005 | Ridge | |
| 7,103,668 B1 | 9/2006 | Corley et al. | |
| 7,421,127 B2 | 9/2008 | Bruls et al. | |
| 7,447,791 B2 | 11/2008 | Leaning et al. | |
| 7,760,990 B2 | 7/2010 | Kato | |
| 7,944,808 B2 | 5/2011 | Yoon et al. | |
| 8,023,585 B2* | 9/2011 | Majima | 375/295 |
| 8,176,029 B2 | 5/2012 | Wang | |
| 8,284,845 B1* | 10/2012 | Kovacevic | H04N 21/4305 370/389 |
| 8,341,662 B1 | 12/2012 | Bassett et al. | |
| 8,619,851 B2 | 12/2013 | Ito | |
| 8,661,105 B2 | 2/2014 | Tian et al. | |
| 2002/0053085 A1 | 5/2002 | Toguri | |
| 2002/0161739 A1 | 10/2002 | Oh | |
| 2003/0061369 A1 | 3/2003 | Aksu et al. | |
| 2003/0072376 A1 | 4/2003 | Krishnamachari et al. | |
| 2003/0177503 A1 | 9/2003 | Sull et al. | |
| 2003/0189649 A1 | 10/2003 | Kuno | |
| 2003/0236895 A1 | 12/2003 | Ohkubo et al. | |
| 2004/0064572 A1 | 4/2004 | Yamaguchi et al. | |
| 2004/0064573 A1 | 4/2004 | Leaning et al. | |
| 2004/0119814 A1 | 6/2004 | Clisham et al. | |
| 2004/0220966 A1 | 11/2004 | Ridge | |
| 2005/0018873 A1 | 1/2005 | Rhoads | |
| 2005/0047345 A1 | 3/2005 | Suh | |
| 2005/0071491 A1 | 3/2005 | Seo | |
| 2005/0102371 A1 | 5/2005 | Aksu | |
| 2005/0123136 A1 | 6/2005 | Shin et al. | |
| 2005/0135476 A1 | 6/2005 | Gentric et al. | |
| 2005/0160177 A1 | 7/2005 | Kim | |
| 2005/0183120 A1 | 8/2005 | Jain et al. | |
| 2005/0193138 A1 | 9/2005 | Kim | |
| 2005/0193425 A1 | 9/2005 | Sull et al. | |
| 2005/0198282 A1 | 9/2005 | Stahl et al. | |
| 2005/0234892 A1 | 10/2005 | Tamura | |
| 2005/0262541 A1 | 11/2005 | Oota | |
| 2006/0037057 A1 | 2/2006 | Xu | |
| 2006/0120378 A1 | 6/2006 | Usuki et al. | |
| 2006/0126713 A1 | 6/2006 | Chou et al. | |
| 2006/0165379 A1* | 7/2006 | Agnihotri | G06F 17/30787 386/231 |
| 2007/0003251 A1 | 1/2007 | Chung et al. | |
| 2007/0016657 A1 | 1/2007 | Ito | |
| 2007/0025687 A1 | 2/2007 | Kim | |
| 2007/0101164 A1 | 5/2007 | Ando et al. | |
| 2007/0177854 A1 | 8/2007 | Ando et al. | |
| 2008/0040498 A1 | 2/2008 | Setlur et al. | |
| 2008/0069204 A1 | 3/2008 | Uchiike | |
| 2008/0109532 A1 | 5/2008 | Denoual et al. | |
| 2008/0177865 A1 | 7/2008 | Heo et al. | |
| 2008/0195743 A1 | 8/2008 | Brueck et al. | |
| 2008/0301380 A1* | 12/2008 | Itho | 711/154 |
| 2009/0010273 A1 | 1/2009 | Green et al. | |
| 2009/0018681 A1 | 1/2009 | Lee et al. | |
| 2009/0031007 A1 | 1/2009 | Boic et al. | |
| 2009/0055417 A1 | 2/2009 | Hannuksela | |
| 2009/0058822 A1* | 3/2009 | Chaudhri | 345/173 |
| 2009/0089535 A1 | 4/2009 | Lohmar et al. | |
| 2009/0097819 A1 | 4/2009 | Dui et al. | |
| 2009/0106288 A1 | 4/2009 | Yang et al. | |
| 2009/0110060 A1 | 4/2009 | Cortes et al. | |
| 2009/0138477 A1* | 5/2009 | Piira | G06F 17/30017 |
| 2009/0141888 A1 | 6/2009 | Kim et al. | |
| 2009/0204487 A1 | 8/2009 | Cansler et al. | |
| 2009/0258594 A1 | 10/2009 | Martin-Cocher et al. | |
| 2009/0300145 A1 | 12/2009 | Musayev et al. | |
| 2010/0046611 A1 | 2/2010 | Toma et al. | |
| 2010/0138489 A1 | 6/2010 | Corley et al. | |
| 2010/0150245 A1* | 6/2010 | Camp et al. | 375/240.25 |
| 2011/0029649 A1 | 2/2011 | Tian et al. | |
| 2011/0055881 A1* | 3/2011 | Yu et al. | 725/88 |
| 2011/0119394 A1 | 5/2011 | Wang et al. | |
| 2015/0256585 A1 | 9/2015 | Brueck et al. | |
| 2016/0323342 A1 | 11/2016 | Luby et al. | |

FOREIGN PATENT DOCUMENTS

| | | |
|---|---|---|
| CN | 2004-88766 A | 3/2004 |
| CN | 1481643 A | 3/2004 |
| CN | 1559119 A | 12/2004 |
| CN | 1568620 A | 1/2005 |
| CN | 1575603 A | 2/2005 |
| CN | 1592418 A | 3/2005 |
| CN | 1625880 A | 6/2005 |
| CN | 1698378 A | 11/2005 |
| CN | 1764974 A | 4/2006 |
| CN | 1784652 A | 6/2006 |
| CN | 1787422 A | 6/2006 |
| CN | 2006-311328 A | 11/2006 |
| CN | 1902865 A | 1/2007 |
| CN | 1985321 A | 6/2007 |
| CN | 1988547 A | 6/2007 |
| CN | 101014947 A | 8/2007 |
| CN | 101018323 A | 8/2007 |
| CN | 101247511 A | 8/2008 |
| CN | 2008-236667 A | 10/2008 |
| CN | 101321265 A | 12/2008 |
| CN | 101365128 A | 2/2009 |
| CN | 101371307 A | 2/2009 |
| CN | 101459809 A | 6/2009 |
| CN | 101518027 A | 8/2009 |
| CN | 101521583 A | 9/2009 |
| EP | 1 043 892 A1 | 10/2000 |
| EP | 1395014 B1 | 6/2006 |
| EP | 2117143 A2 | 11/2009 |
| JP | 06-252876 A | 9/1994 |
| JP | 200013761 A | 1/2000 |
| JP | 2000-341640 A | 12/2000 |
| JP | 2001-024994 A | 1/2001 |
| JP | 2001-359081 A | 12/2001 |
| JP | 2003-087737 A | 3/2003 |
| JP | 2003-111048 A | 4/2003 |
| JP | 2003-235031 A | 8/2003 |
| JP | 2004-013283 A | 1/2004 |
| JP | 2004-135307 A | 4/2004 |
| JP | 2004-140584 A | 5/2004 |
| JP | 2004-140654 A | 5/2004 |
| JP | 2004-516717 A | 6/2004 |
| JP | 2004-186890 A | 7/2004 |
| JP | 2004-215074 A | 7/2004 |
| JP | 2004-312304 A | 11/2004 |
| JP | 2004-328204 A | 11/2004 |
| JP | 2005-039667 A | 2/2005 |
| JP | 2005-073138 A | 3/2005 |
| JP | 2005-229153 A | 8/2005 |
| JP | 2005-303927 A | 10/2005 |
| JP | 2006-304232 A | 11/2006 |
| JP | 2007-11584 A | 1/2007 |
| JP | 2007-25959 A | 2/2007 |
| JP | 2007-036666 A | 2/2007 |
| JP | 2007-518294 A | 7/2007 |
| JP | 2007-274142 A | 10/2007 |
| JP | 2008-97381 A | 4/2008 |
| JP | 2008-219267 A | 9/2008 |
| JP | 2009-17345 A | 1/2009 |

(56) References Cited

FOREIGN PATENT DOCUMENTS

| | | |
|---|---|---|
| JP | 2009-134700 A | 6/2009 |
| JP | 2009-159625 A | 7/2009 |
| JP | 2013-505680 A | 2/2013 |
| KR | 10-0805308 B1 | 2/2008 |
| KR | 10-2008-0099629 A | 11/2008 |
| KR | 10-2009-0001707 A | 1/2009 |
| KR | 10-2009-0028017 A | 3/2009 |
| KR | 10-2009-0036765 A | 4/2009 |
| KR | 10-2009-0063775 A | 6/2009 |
| KR | 10-0920733 B1 | 10/2009 |
| KR | 10-2010-0007368 A | 1/2010 |
| WO | 02/49343 A1 | 6/2002 |
| WO | 2005/043783 A1 | 5/2005 |
| WO | 2006105158 A1 | 10/2006 |
| WO | 2007/095834 A1 | 8/2007 |
| WO | 2008/062979 A1 | 5/2008 |
| WO | 2008/130191 A1 | 10/2008 |
| WO | 2009/119394 A1 | 10/2009 |
| WO | 2009/158344 A2 | 12/2009 |

OTHER PUBLICATIONS

International Search Report dated Aug. 16, 2011 in counterpart international application No. PCT/KR2010/008060.
Written Opinion of the International Searching Authority dated Aug. 16, 2011 in counterpart international application No. PCT/KR2010/008060.
International Search Report (PCT/ISA/210) dated Aug. 23, 2011 in the International Patent Application No. PCT/KR2010/008696.
International Search Report (PCT/ISA/210) dated Jul. 13, 2011 in the International Patent Application No. PCT/KR2010/008017.
International Search Report (PCT/ISA/210) dated Jul. 15, 2011 in the International Patent Application No. PCT/KR2010/008068.
International Search Report (PCT/ISA/210) dated Jul. 23, 2011 in the International Patent Application No. PCT/KR2010/008015.
International Search Report (PCT/ISA/210) dated Jul. 8, 2011 in the International Patent Application No. PCT/KR2010/008016.
International Search Report (PCT/ISA/210) dated Mar. 28, 2012 in the International Patent Application No. PCT/KR2011/004064.
International Search Report for PCT/KR2010/008016 dated Jul. 8, 2011 [PCT/ISA/210 & 220].
Written Opinion for PCT/KR2010/008016 dated Jul. 8, 2011 [PCT/ISA/237].
International Search Report for PCT/KR2010/008017 dated Jul. 13, 2011 [PCT/ISA/210 & 220].
Written Opinion for PCT/KR2010/008017 dated Jul. 13, 2011 [PCT/ISA/237].
International Search Report for PCT/KR2011/001268 dated Nov. 25, 2011 [PCT/ISA/210 & 220].
Written Opinion for PCT/KR2011/001268 dated Nov. 25, 2011 [PCT/ISA/237].
International Search Report for PCT/KR2011/001898 dated Nov. 3, 2011 [PCT/ISA/210 & 220].
Written Opinion for PCT/KR2011/001898 dated Nov. 3, 2011 [PCT/ISA/237].
Communication dated Feb. 7, 2014 issued by the European Patent Office in counterpart European Application No. 10830205.0.
Pantos R., et al., "HTTP Live Streaming; draft-pantos-http-live-straming-0.2.txt", Oct. 5, 2009, 20 pgs. total, XP015064407.
Alex Zambelli, "IIS Smooth Streaming Technical Overview", Mar. 31, 2009, 17 pgs. total, XP055009366.
Jin Young Lee et al., "DASH Evaluation Experiment #1: Compositions of Media Presentation (CMP) Proposal Comparison", Oct. 15, 2010, 56 pgs. total, XP030046599.
Wager Zia, "A few comments on LGE proposal about delivery of MPEG-2-TS", Oct. 15, 2010, 3 pgs. total, XP030047157.
Communication dated Feb. 12, 2014 issued by the European Patent Office in counterpart European Application No. 10830206.8.
Communication dated Feb. 12, 2014 issued by the European Patent Office in counterpart European Application No. 10830223.3.
Communication dated Feb. 25, 2014 issued by the European Patent Office in counterpart European Application No. 10830218.3.
Communication dated Mar. 4, 2014 issued by the European Patent Office in counterpart European Application No. 10830204.3.
Jaeyeon Song, et al., "Response to Call for Proposals for HTTP Streaming of MPEG Media standard", Jul. 30, 2010, 60 pgs. total, XP030046369.
Gerard Fernando, et al., "HTTP Streaming Solution-Response to Call for Proposal", Jul. 30, 2010, 32 pgs. total, XP030046346.
European Search Report dated Apr. 25, 2014 issued by the European Patent Office in counterpart European Application No. 10836186.6.
John A. Bocharov, "Smooth Streaming Technical Overview", CM-IPTV0560, Oct. 20, 2009, 18 pgs. total, XP017826991.
Communication dated Apr. 25, 2014 issued by the European Patent Office in counterpart European Application No. 11747701.8.
Communication dated Apr. 25, 2014 issued by the European Patent Office in counterpart European Application No. 11756585.3.
Communication dated Feb. 18, 2014 issued by the State Intellectual Property Office of P.R. China in counterpart Chinese Application No. 201080055449.8.
Communication dated Apr. 15, 2014 issued by the State Intellectual Property Office of P.R. China in counterpart Chinese Application No. 201080061413.0.
Communication dated May 22, 2014 issued by the European Patent Office in counterpart European Application No. 11790033.2.
Communication dated Jul. 2, 2014 issued by the State Intellectual Property Office of P.R. China in counterpart Chinese Application No. 201080061417.9.
Communication dated Jul. 3, 2014 issued by the State Intellectual Property Office of P.R. China in counterpart Chinese Application No. 201180010793.X.
Communication dated Jul. 1, 2014 issued by the Japanese Patent Office in counterpart Japanese Application No. 2012-538764.
Communication dated Jul. 15, 2014 issued by the Japanese Patent Office in counterpart Japanese Application No. 2012-538765.
Communication dated Aug. 27, 2014, issued by the State Intellectual Property Office of the People's Republic of China in counterpart Chinese Application No. 201080061494.4.
Communication dated Aug. 4, 2014, issued by the State Intellectual Property Office of the People's Republic of China in counterpart Chinese Application No. 201080061416.4.
Communication dated Aug. 5, 2014, issued by the Japanese Patent Office in counterpart Japanese Application No. 2012-538771.
Communication dated Aug. 20, 2014, issued by the State Intellectual Property Office of the People's Republic of China in counterpart Chinese Application No. 201080061434.2.
Communication dated Aug. 5, 2014, issued by the Japanese Patent Office in counterpart Japanese Application No. 2012-538768.
Communication dated Aug. 19, 2014, issued by the Japanese Patent Office in counterpart Japanese Application No. 2012-543023.
Communication dated Sep. 24, 2014, issued by the Japanese Patent Office in counterpart Japanese Application No. 2012-553824.
Communication dated Mar. 24, 2015 issued by European Patent Office in counterpart European Application No. 11756585.3.
"Transparent End-to-End Packet-Switched Streaming Service (PSS); Protocols and Codecs (Release 9)", 3GPP TS 26.234, Mar. 2012, 188 pages total.
"Release 2 Specification HTTP Adaptive Streaming", Open IPTV Forum, Sep. 2010, 25 pages total.
Communication dated Nov. 3, 2014, issued by the State Intellectual Property Office of the People's Republic of China in counterpart Chinese Application No. 201180014696.8.
Communication dated Dec. 19, 2014, issued by the Japanese Patent Office in counterpart Japanese Application No. 2012-543023.
Communication from the Japanese Patent Office dated Mar. 23, 2015 in a counterpart Japanese application No. 2012-553824.
Communication from the State Intellectual Property Office of P.R. China dated Mar. 17, 2015 in a counterpart application No. 201080061417.9.
Communication from the Japanese Patent Office dated Apr. 13, 2015 in a counterpart Japanese application No. 2012-538771.
Communication from the Japanese Patent Office dated Feb. 2, 2015 in a counterpart Japanese application No. 2012-538765.

(56) References Cited

OTHER PUBLICATIONS

Communication from the Japanese Patent Office dated Apr. 6, 2015 in a counterpart Japanese application No. 2012-538764.
Communication dated Jul. 9, 2015, issued by the State Intellectual Property Office of P.R. China in counterpart Chinese Application No. 201180014696.8.
Communication dated Aug. 13, 2015, issued by the State Intellectual Property Office of P.R. China in counterpart Chinese Application No. 201080061417.9.
Communication dated Aug. 5, 2015, issued by the State Intellectual Property Office of P.R. China in counterpart Chinese Application No. 201180027573.8.
Communication dated Apr. 27, 2015 issued by the Japanese Patent Office in counterpart Japanese Patent Application No. 2012-538768.
Communication dated May 18, 2015, issued by the State Intellectual Property Office of the People's Republic of China in counterpart Chinese Application No. 201080061494.4.
Communication from the State Intellectual Property Office of P.R. China dated Dec. 4, 2015 in a counterpart Chinese application No. 201080061494.4.
Alex Zambelli, "IIS Smooth Streaming Technical Overview", Microsoft Corporation, Mar. 2009, pp. 1-17.
Communication dated Jul. 15, 2016, issued by the Korean Intellectual Property Office in counterpart Korean application No. 10-2010-0103727.
Communication dated Aug. 15, 2016, issued by the Japanese Patent Office in counterpart Japanese application No. 2015-156368.
Communication dated Sep. 12, 2016, issued by the Japanese Patent Office in counterpart Japanese application No. 2012-538764.
Communication dated Aug. 1, 2016, issued by the State Intellectual Property Office of P.R. China in counterpart Chinese application No. 201080061494.4.
Communication dated Aug. 29, 2016, issued by the Japanese Patent Office in counterpart Japanese application No. 2015-159842.
Communication dated Aug. 29, 2016, issued by the Japanese Patent Office in counterpart Japanese application No. 2012-538771.
Qualcomm Incorporated, et al., "3GPP Adaptive HTTP Streaming", Proposal to MPEG HTTP Streaming, 93rd MPEG meeting, Geneva, XP030001643, Jul. 22, 2010, pp. 1-61.
Qualcomm Incorporated, "Adaptive HTTPStreaming: Usage of the 3GPP File Format", 3GPP TSG-SA4 AHI Meeting, SA-AH1172, Mar. 2-4, 2010, Aachen, Germany, XP050437444, pp. 1-8.
Communication dated Sep. 29, 2016, issued by the European Patent Office in counterpart European Application No. 11747701.8.
Qualcomm Incorporated, "Pseudo CR: Adaptive HTTP Streaming—Full Solution Proposal", 3GPP TSG-SA4 #57, S4-100060, Jan. 25-29, 2010, St Julians, Malta, URL:http://www.3gpp.org/ftp/tsg_sa/WG4_CODEC/TSGS4_57/Docs/S4-100060.zip, total 17 pages.
Communication dated Sep. 26, 2016, issued by the Japanese Patent Office in counterpart Japanese application No. 2015-146132.
Huawei Technologies Co., Ltd., "Live Content Support in Static HTTP Streaming", 3GPP TSG-SA4 #56, S4-090857, Nov. 9-13, 2009, Sophia-Antipolis, URL:http://www.3gpp.org/ftp/tsg_sa/WG4_CODEC/TSGS4_56/Docs/S4-090857.zip France, total 6 pages.
Anonymous, "OIPF Release 1 Specification vol. 2—Media Formats V 1.1" Open IPTV Forum, Oct. 8, 2009, 22 pages total.
Anonymous, "Open IPTV Forum—Functional Architecture—V 1.1" Open IPTV Forum, Jan. 15, 2008, 141 pages total.
Anonymous, "OIPF Release 1 Specification vol. 3—Content Metadata V 1.1", Open IPTV Forum, Oct. 8, 2009, 47 pages total.
Communication dated Oct. 3, 2016, issued by the Japanese Patent Office in counterpart Japanese Patent Application No. 2012-553824.
Communication dated Oct. 31, 2016, issued by the Korean Intellectual Property Office in counterpart Korean Patent Application No. 10-2010-0103721.
Communication dated Oct. 31, 2016, issued by the Korean Intellectual Property Office in counterpart Korean Patent Application No. 10-2010-0103722.
Communication dated Nov. 7, 2016, issued by the Japanese Patent Office in counterpart Japanese Patent Application No. 2015-167763.
Communication dated Dec. 19, 2016, issued by the Japanese Patent Office in counterpart Japanese Patent Application No. 2015-156368.
Chen, et al., "Response to the CfP on HTTP Streaming: Adaptive Video Streaming based on AVC", International Organization for Standardisation, MPEG Meeting, Jul. 26, 2010-Jul. 30, 2010, Issue No. M17909, pp. 1-20, Geneva, Switzerland, XP030046499.
Communication dated Apr. 1, 2016, issued by the State Intellectual Property Office of the People's Republic of China in counterpart Chinese Patent Application No. 201180027573.8.
Communication dated Apr. 25, 2016, issued by the European Patent Office in counterpart European Patent Application No. 10830204.3.
Communication dated May 9, 2016, issued by the European Patent Office in counterpart European Patent Application No. 11790033.2.
S. Bradner, "Key words for use in RFCs to Indicate Requirement Levels", Network Working Group, Harvard University, Mar. 1997, Total 3 pages, URL: https://www.ietf.org/rfc/rfc2119.txt.
"Digital Video Broadcasting (DVB); Specification for the use of Video and Audio Coding in Broadcasting Applications based on the MPEG-2 Transport Stream", EBU-UER, ETSI TS 101 154 V1.9.1, Sep. 2009, Total 163 pages.
"Digital Video Broadcasting (DVB); Transport of MPEG-2 TS Based DVB Services over IP Based Networks", EBU-UER, ETSI TS 102 034 V1.3.1, Oct. 2007, Total 128 pages.
"Information technology—Generic coding of moving pictures and associated audio information: systems", International Telecommunication Union, Telecommunication Standardization Sector of ITU, Transport of AVC video data over Recommendation H.222.0 (2000)—Amendment 3 (Mar. 2004), ISO/IEC 13818-1 streams, Total 28 pages.
"Information technology—Coding of audio-visual objects—Part 12: ISO base media file format", International Standard, ISO/IEC 14496-12:2005(E), Total 94 pages, Oct. 1, 2005.
"Information technology—Coding of audio-visual objects—Part 14: MP4 file format", International Standard, ISO/IEC 14496-14:2003(E), Total 18 pages, Nov. 15, 2003.
"Information technology—Coding of audio-visual objects—Part 15: Advanced Video Coding (AVC) file format", International Standard, ISO/IEC 14496-15:2004(E), Total 29 pages, Apr. 15, 2004.
Thomas Wiegand et al., "Editing state of text relating to ITU-T Rec. H.264 | ISO/IEC 14496-10 Amendments 1 and 2—Advanced video coding for generic audiovisual services", Series H: Audiovisual and Multimedia Systems, Infrastructure of audiovisual services—Coding of moving video, Total 385 pages, Mar. 2005.
"Information technology—Generic coding of moving pictures and associated audio information—Part 2: Video", International Standard, ISO/IEC 13818-2:2013(E), Total 13 pages, Oct. 1, 2013.
"Digital Video Broadcasting (DVB); Subtitling systems", EBU-UER, ETSI EN 300 743 V1.3.1, Nov. 2006, Total 51 pages.
"Digital Video Broadcasting (DVB); Specification for conveying ITU-R System B Teletext in DVB bitstreams", EBU-UER, ETSI EN 300 472 V1.3.1, May 2003, Total 11 pages.
"Information technology—Coding of audio-visual objects—Part 3: Audio", International Standard, ISO/IEC 14496-3:2009(E), Total 18 pages, Sep. 1, 2009.
"Digital Audio Compression (AC-3, Enhanced AC-3) Standard", EBU-UER, ETSI TS 102 366 V1.2.1, Aug. 2008, Total 214 pages.
"Information Technology—Digital Compression and Coding of Continuous-Tone Still Images—Requirements and Guidelines", International Telecommunication Union, The International Telegraph and Telephone Consultative Committee (CCITT), Recommendation T.81, Sep. 1992, Total 186 pages.
"Information technology—Coding of audio-visual objects—Part 2: Visual", International Standard, ISO/IEC 14496-2:2004(E), Total 19 pages.
"Universal Mobile Telecommunications System (UMTS); LTE; Transparent end-to-end Packet-switched Streaming Service (PSS); Protocols and codecs", ETSI TS 126 234 V9.7.0, Jan. 2012, 3GPP TS 26.234 version 9.7.0 Release 9, Total 191 pages.
"Digital cellular telecommunications system (Phase 2+); Universal Mobile Telecommunications System (UMTS); LTE; Transparent

(56) References Cited

OTHER PUBLICATIONS end-to-end packet switchedstreaming service (PSS); 3GPP file format (3GP)", ETSI TS 126 244 V9.0.0, Jan. 2010, 3GPP TS 26.244 version 9.0.0 Release 9, Total 54 pages.

Communication dated Jan. 19, 2017, issued by the Korean Intellectual Property Office in counterpart Korean Patent Application No. 10-2010-0103725.

Communication dated Jan. 30, 2017, issued by the Japanese Patent Office in counterpart Japanese Patent Application No. 2015-146132.

Communication dated Feb. 21, 2017, issued by the Korean Intellectual Property Office in counterpart Korean Patent Application No. 10-2010-0103698.

Communication dated Mar. 15, 2017, issued by the Korean Intellectual Property Office in counterpart Korean Patent Application No. 10-2011-0011110.

Communication dated Mar. 28, 2017, issued by the State Intellectual Property Office of the People's Republic of China in counterpart Chinese Patent Application No. 201080061494.4.

\* cited by examiner

FIG. 4A

```
<Tracks>
    <Track ID="1" Type="Packed" BitRate="200000">
    <Track ID="2" Type="Video" BitRate="400000">
</Tracks>
```

FIG. 4B

```
<RefData Type="HEAD-TS" ID="1">
    <URL>http://www.altova.com/movie1/head1.ref</URL>
</RefData>
<RefData Type="HEAD-TS" ID="2">
    <URL>http://www.altova.com/movie1/head2.ref</URL>
</RefData>
```

FIG. 4C

```
<Fragments NextFragmentsXMLURL="http://www.altova.com/movie1/NextMeta.xml">
    <Fragment StartTime="14:20:00.0Z" Duration='00:00:02.0z" ID="1"
BitRate="200000">
        <URL>http://www.altova.com/movie1/slice1-1.as</URL>
        <RefPointer>1</RefPointer>
    <Fragment StartTime="14:20:00.0Z" Duration='00:00:02.0z" ID="1"
BitRate="400000">
        <URL>http://www.altova.com/movie1/slice2-1.as</URL>
        <RefPointer>2</RefPointer>
</Fragments>
```

FIG. 7

```
<ContentItem>
  <Title xml:lang="en-us">Example</Title>
  <Synopsis xml:lang="en-us">String</Synopsis>
  <OriginSite>http://asexample.com</OriginSite>
  <OriginSiteName>Example</OriginSiteName>
  <ContentID>18888</ContentID>
  <ContentURL VideoCoding="AVC" Duration="14:20:00.00" Size="0" MediaFormat="MP4" DRMSystemID="12" MD5Hash=
"String" MIMIType="video/MP4"TransferType="AS-CoD" AudioCoding="AAC">http://asexample.com/vod/movies/18888/
    Meta/MainMeta.xml</ContentURL>
</ContestItem>
</Contents>
```

FIG. 9A

```xml
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header2.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Audio" Bitrate="64000" StartTime="00:00:00" SegmentDuration="00:00:30" SegmentStartID="1000" SegmentCount="120"/>
    <Track ID="5" Type="I-Frame" Bitrate="500000" StartTime="00:00:00" SegmentDuration="00:00:10" SegmentStartID="1000" SegmentCount="360"/>
</AdaptiveControl>
```

FIG. 9B

```xml
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:00:00" SegmentDuration="00:00:06" SegmentStartID="1000" SegmentCount="10"/>
    <Track ID="2" Type="Video" Bitrate="1000000" StartTime="10:00:00" SegmentDuration="00:00:06" SegmentStartID="1000" SegmentCount="10"/>
    <Track ID="3" Type="Video" Bitrate="2000000" StartTime="10:00:00" SegmentDuration="00:00:06" SegmentStartID="1000" SegmentCount="10"/>
    <Track ID="4" Type="Audio" Bitrate="64000" StartTime="10:00:00" SegmentDuration="00:00:30" SegmentStartID="1000" SegmentCount="2"/>
</AdaptiveControl>
```

FIG. 9C

```
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:01:00" SegmentDuration="00:00:06" SegmentStartID="1010" SegmentCount="10"/>
    <Track ID="2" Type="Video" Bitrate="1000000" StartTime="10:01:00" SegmentDuration="00:00:06" SegmentStartID="1010" SegmentCount="10"/>
    <Track ID="3" Type="Video" Bitrate="2000000" StartTime="10:01:00" SegmentDuration="00:00:06" SegmentStartID="1010" SegmentCount="10"/>
    <Track ID="4" Type="Audio" Bitrate="64000" StartTime="10:01:00" SegmentDuration="00:00:30" SegmentStartID="1010" SegmentCount="2"/>
</AdaptiveControl>
```

FIG. 9D

```
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:10" SegmentStartID="1000" SegmentCount="360"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9E

```
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:10" SegmentStartID="1000" SegmentCount="60"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9F

```
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:02:00" SegmentDuration="00:00:10" SegmentStartID="1000" SegmentCount="348"/>
    <Track ID="3" Type="Video" Bitrate="2000000" StartTime="00:02:00" SegmentDuration="00:00:10" SegmentStartID="1000" SegmentCount="348"/>
    <Track ID="4" Type="Video" Bitrate="3000000" StartTime="00:02:00" SegmentDuration="00:00:10" SegmentStartID="1000" SegmentCount="348"/>
    <Track ID="5" Type="Video" Bitrate="4000000" StartTime="00:02:00" SegmentDuration="00:00:10" SegmentStartID="1000" SegmentCount="348"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9G

```xml
<AdaptiveControl xsi:noNamespaceSchemaLocation="samsung_as.xsd" xmlns:xsi="http://www.w3.org/2001/XMLSchema-instance">
  <NextAdaptiveControlURL>http://asexample.com/live/movies/18888/Meta/NextMeta.xml</NextAdaptiveControlURL>
  <Track ID="1" Type="Packed" BitRate="500000">
    <Segment StartTime="00:00:00.00" Duration="00:02:00.00" ID="1000">
      <URL>http://ad_server.com/ad_for_adaptive/ad1.ts</URL>
    </Segment>
  </Track>
</AdaptiveControl>
```

FIG. 9H

```xml
<AdaptiveControl xsi:noNamespaceSchemaLocation="samsung_as.xsd" xmlns:xsi="http://www.w3.org/2001/XMLSchema-instance">
  <URLTemplate>http://asexample.com/vod/movies/18888/Tracks/Seg{TrackID}-{SegmentID}.as</URLTemplate>
  <NextAdaptiveControlURL>http://asexample.com/live/movies/18888/Meta/NextMeta.xml</NextAdaptiveControlURL>
  <RefDataURL>http://asexample.com/vod/movies/18888/References/header.ref</RefDataURL>
  <Track ID="1" Type="Video" Bitrate="500000" StartTime="10:00:00" SegmentDuration="00:00:06" SegmentStartID="1000" SegmentCount="10"/>
  <Track ID="2" Type="Video" Bitrate="1000000" StartTime="10:00:00" SegmentDuration="00:00:06" SegmentStartID="1000" SegmentCount="10"/>
  <Track ID="3" Type="Video" Bitrate="2000000" StartTime="10:00:00" SegmentDuration="00:00:06" SegmentStartID="1000" SegmentCount="10"/>
  <Track ID="4" Type="Audio" language="EN" Bitrate="64000" StartTime="10:00:00" SegmentDuration="00:00:30" SegmentStartID="1000" SegmentCount="2"/>
  <Track ID="5" Type="Audio" language="KR" Bitrate="64000" StartTime="10:00:00" SegmentDuration="00:00:30" SegmentStartID="1000" SegmentCount="2"/>
  <Track ID="6" Type="Subtitle" language="EN" Bitrate="0" StartTime="10:00:00" SegmentDuration="00:00:30" SegmentStartID="1000" SegmentCount="2"/>
  <Track ID="7" Type="Subtitle" language="KR" Bitrate="0" StartTime="10:00:00" SegmentDuration="00:00:30" SegmentStartID="1000" SegmentCount="2"/>
</AdaptiveControl>
```

FIG. 17A

```
                                          1701
┌─────────────────────────────────────────────────┐
│ 1st Manifest:                                   │
│ <Manifest contentType="program">                │
│    <nextManifest availablityTime="00:15:00" URL="..."/> │
│    <program id="001" startTime=00:00:00 endTime=00:20:00> │
│       <stream> ... </stream>                    │
│            ...                                  │
│    </program>                                   │
│ </Manifest>                                     │
└─────────────────────────────────────────────────┘
```

FIG. 17B

```
                                          1702
┌─────────────────────────────────────────────────┐
│ 2nd Manifest:                                   │
│ <Manifest contentType="program">                │
│    <program id="001" startTime=00:15:00 endTime=00:20:00> │
│       <stream> ... </stream>                    │
│            ...                                  │
│    </program>                                   │
│    <program id="002" startTime=00:20:00 endTime=01:20:00> │
│       <stream> ... </stream>                    │
│            ...                                  │
│    </program>                                   │
│ </Manifest>                                     │
└─────────────────────────────────────────────────┘
```

FIG. 18

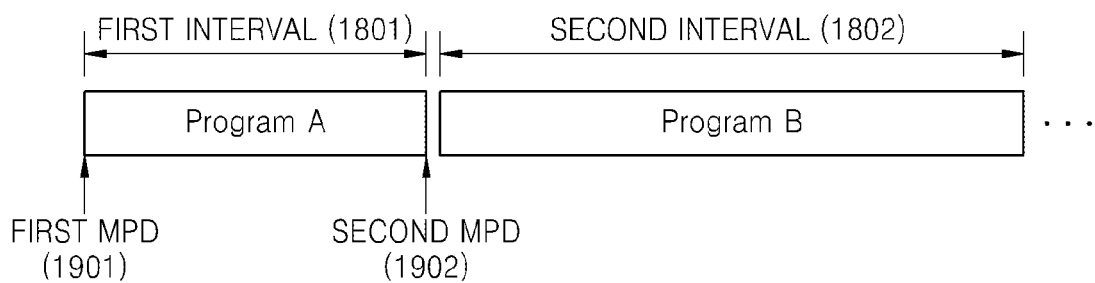

FIG. 19A

```
                                                      1901
┌─────────────────────────────────────────────────────────┐
│ Manifest A:                                             │
│ <Manifest ...>                                          │
│   <nextManifest availablityTime="20" URL="Manifest B.xml"/> │
│   <program id="001", startTime=00:00:00 endTime=00:20:00>   │
│   ...                                                   │
│ </Manifest>                                             │
└─────────────────────────────────────────────────────────┘
```

FIG. 19B

```
                                                      1902
┌─────────────────────────────────────────────────────────┐
│ Manifest B:                                             │
│ <Manifest ...>                                          │
│   <nextManifest availablityTime="60" URL="Manifest C.xml"/> │
│   <program id="002", startTime=00:20:00 endTime=01:20:00>   │
│   ...                                                   │
│ </Manifest>                                             │
└─────────────────────────────────────────────────────────┘
```

```
                                                     2101
1st Manifest:
<Manifest contentType="program">
   <nextManifest availablityTime="00:15:00" URL="..."/>
   <program id="001" startTime=00:00:00 endTime=00:20:00>
      <stream> ... </stream>
         ...
   </program>
</Manifest>
```

```
2nd Manifest:
<Manifest contentType="program">
    <nextManifest availablityTime="00:30:00" URL="..."/>
    <program id="001" startTime=00:15:00 endTime=00:20:00>
        <stream> ... </stream>
                    ...
    </program>
    <program id="002" startTime=00:20:00 endTime=00:40:00>
        <stream> ... </stream>
                    ...
    </program>
</Manifest>
```

```
3rd Manifest:
<Manifest contentType="program">
    <program id="002" startTime=00:30:00 endTime=01:20:00>
        <stream> ... </stream>
                    ...
    </program>
</Manifest>
```

METHOD AND APPARATUS FOR PROVIDING AND RECEIVING DATA

CROSS-REFERENCE TO RELATED PATENT APPLICATIONS

This application claims the benefit of U.S. Provisional Application No. 61/260,906, filed on Nov. 13, 2009 and U.S. Provisional Application No. 61/310,921, filed on Mar. 5, 2010 in the U.S. Patents and Trademark Office, and Korean Patent Application No. 10-2010-0103726, filed on Oct. 22, 2010, in the Korean Intellectual Property Office, the disclosures of which are incorporated herein in its entirety by reference.

BACKGROUND

1. Field

Methods and apparatuses consistent with exemplary embodiments relate to providing and receiving data, and more particularly, to providing additional information required to provide live streaming, and receiving live streaming.

2. Description of the Related Art

Examples of methods for transmitting media data through a network include a downloading method and a streaming method. According to the streaming method, a server transmits media data in real time, and a client reproduces the received media data in real time, and additional information about data to be received next may be acquired in advance. Alternatively, according to the downloading method, additional information about all data may be acquired in advance and data may be received by using the additional information. However, the streaming method requires an efficient use of bandwidth, unlike the downloading method, and thus it is more difficult to use the streaming method in place of the downloading method.

SUMMARY

The present invention provides a method and apparatus for efficiently providing and receiving live streaming data.

According to an aspect of an exemplary embodiment, there is provided a method of receiving data including: receiving first additional information including information about a first interval of a plurality of media data generated by encoding content in different qualities; acquiring renewal time information indicating a point of time for the first additional information to be renewed by using the first additional information; and receiving second additional information including information about a second interval of the plurality of media data based on the renewal time information.

The method may further include: receiving data corresponding to the first interval of at least one media data from among the plurality of media data based on the first additional information using a streaming method; and receiving data corresponding to the second interval of the at least one media data based on the second additional information using a streaming method.

The second additional information may have the same attribute structure as the first additional information.

The first additional information may further include location information about the second additional information.

The second additional information may have an attribute structure which differs from the first additional information.

The first interval and the second interval may be classified according to programs to be provided by the first interval and the second interval.

The first interval and the second interval may be generated by dividing the plurality of media data into predetermined time units.

The first additional information may further include information indicating a starting point of the first interval.

The first additional information may further include information indicating an end point of the first interval.

The first additional information may further include identification information of programs provided from the first interval.

According to another aspect of the exemplary embodiments, there is provided a method of providing data including: generating first additional information including information about a first interval of a plurality of media data generated by encoding content in different qualities and second additional information including information about a second interval of the plurality of media data; transmitting the first additional information to a client; and transmitting the second additional information to the client, when a request to renew the first additional information is received from the client, wherein the first additional information includes renewal time information indicating a point of time for the first additional information to be renewed.

The method may further include adding external data to the first interval; generating third additional information comprising information about data excepting from the first interval due to the insertion of the external data; and changing the first additional information by deleting information about the data excepting from the first additional information and adding information about the external data.

The changing may include registering location of the third additional information to the first additional information as location of next additional information.

According to another exemplary embodiment, there is provided an apparatus for receiving data, including: a receiving unit which receives first information including information about a first interval of a plurality of media data generated by encoding content in different qualities; and an acquiring unit which acquires renewal time information indicating a point of time for a first file to be renewed by using the first information, wherein the receiving unit further receives second information including information about a second interval of the plurality of media data based on the renewal time information.

According to another exemplary embodiment, there is provided an apparatus for providing data, the apparatus including: a generating unit which generates first additional information including information about a first interval of a plurality of media data generated by encoding content in different qualities and second additional information including information about a second interval of the plurality of media data; a transmitting unit which transmits the first additional information to a client; and a request receiving unit which receives a request to renew the first additional information from the client, wherein the transmitting unit further transmits the second additional information to the client, when the request is received, and the first additional information includes renewal time information indicating a point of time for the first additional information to be renewed.

BRIEF DESCRIPTION OF THE DRAWINGS

The above and/or other aspects will become more apparent by describing in detail exemplary embodiments with reference to the attached drawings in which:

FIG. 4A illustrates information for defining a plurality of media data, according to an exemplary embodiment;

FIG. 4B illustrates information about a header of media data, according to an exemplary embodiment;

FIG. 4C illustrates information about at least one segment included in each of a plurality of media data, according to an exemplary embodiment;

FIG. 7 illustrates information about content according to an exemplary embodiment;

FIGS. 9A through 9H illustrate media presentation descriptions according to exemplary embodiments;

FIGS. 17A and 17B illustrate exemplary embodiments of MPDs including information about the media data of FIG. 16;

FIG. 18 illustrates a structure of media data according to another exemplary embodiment;

FIGS. 19A and 19B illustrate exemplary embodiments of MPDs including information about the media data of FIG. 18;

FIG. 20 illustrates exemplary embodiments of a structure of media data;

FIGS. 21A through 21C illustrate exemplary embodiments of MPDs including information about the media data of FIG. 20;

DETAILED DESCRIPTION OF THE INVENTION

For convenience of description, the terminologies used herein will now be simply defined.

Examples of content include audio information, video information, audio-video information and data. A content Item may include a plurality of components that will be described later.

A component is a constituent of the content item such as audio information, video information, and subtitle information. For example, the component may be a subtitle stream written in a predetermined language, or a video stream obtained at a predetermined camera angle. The component may be referred to as a track or an elementary stream (ES) according to a container.

A content resource (e.g., various qualities, various bit rates, and various angles) is a content item that is provided from a plurality of representations in order to perform adaptive streaming on a content item. A service searching process may be referred to as the content resource. The content resource may include periods of at least one continuous time.

A period is a temporal section of the content resource.

Representation is a version (all components, or some components) of a content resource in a period. A plurality of representations may have different subsets of components, or different encoding parameters (e.g., a bit rate) of components. Throughout this specification, representation is referred to as media data, but may be referred to as any terminology for indicating data including at least one component.

A segment is a temporal section of representation indicated by the only content uniform resource locator (URL) in predetermined system layer format (TS, or MP4).

Hereinafter, the exemplary embodiments will be described more fully with reference to the accompanying drawings, in which the exemplary embodiments are shown.

Figure 1:
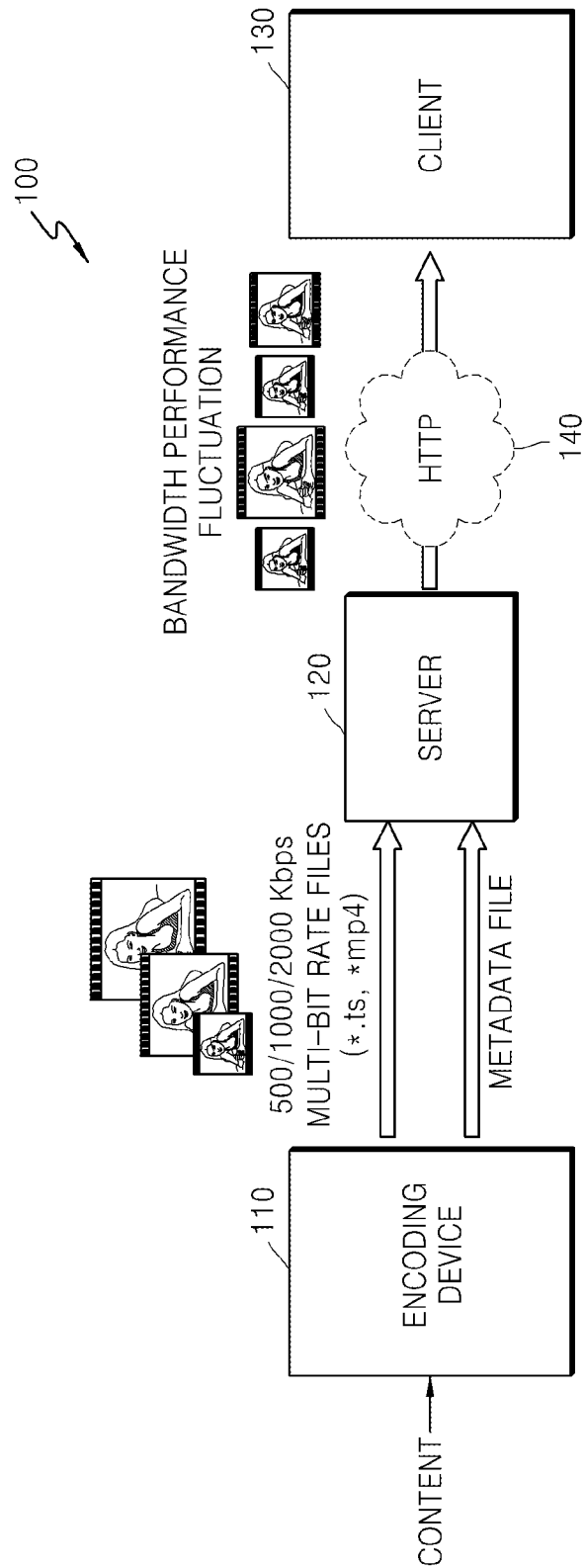
FIG. 1 is a diagram of a streaming system according to an exemplary embodiment.

FIG. 1 is a diagram of a streaming system 100 according to an exemplary embodiment.

Referring to FIG. 1, the streaming system 100 according to the current exemplary embodiment includes an encoding device 110, a server 120, and a client 130.

The encoding device 110 generates a plurality of media data about one input content by encoding the input content to have a plurality of different qualities. However, a streaming environment may change when the server 120 streams media data to the client 130. For example, a bandwidth of a network 140 for streaming may be changed, or a hardware source that may be used by the server 120 to transmit media data, or by the client 130 to receive media data, may be changed.

Accordingly, the encoding device 110 encodes the one content to have different qualities for adaptive streaming according to a fluidic streaming environment. The one content may be encoded to have different qualities by adjusting a factor, such as a bit rate, a sampling frequency, resolution, or a frame rate. For example, a plurality of media data in 500 Kbps, 1000 Kbps, and 2000 Kbps may be generated by encoding one image content in different resolutions.

The plurality of media data in different qualities are transmitted to the server 120, and at this time, information about the content and information about each media data may also be transmitted to the server 120. The information about the content may include information about a title, a synopsis, a content identifier (ID), and a content uniform resource locator (URL) of the content as meta data of the content. The information about each media data may include a quality, a type, an ID, or the like of each media data, and will be described in detail with reference to FIGS. 4A through 4C.

The client 130 receives at least one of the information about content and information about each media data, and requests the server 120 for at least one of the plurality of media data, based on the received at least one of the information about content and information about each media data. The client 130 estimates a streaming environment, and selects at least one of the plurality of media data based on the estimated streaming environment. The at least one media data that may maintain a suitable quality of service (QoS) in the estimated streaming environment may be selected. Then, the client 130 may transmit a hypertext transfer protocol (HTTP) request for requesting the server 120 to transmit the selected at least one media data.

When a streaming environment is deteriorated, and high quality media data is available but continuous reproduction of media data is not possible, low quality media data may be requested from among a plurality of media data. When a streaming environment is improved and high quality media data is available and continuous reproduction of media data is possible, the high quality media data may continue to be requested from among a plurality of media data.

The client 130 may request the server 120 to transmit another media data while receiving a predetermined media data. For example, the client 130, which requested and was receiving first media data that is of low quality in a deteriorated streaming environment, may request the server 120 to transmit second media data that is of a higher quality than the first media data as the streaming environment improves. According to a related art streaming method, when the server 120 and the client 130 sets a quality while initially setting a streaming channel, media data is continuously transmitted and received having the same quality. However, according to the current exemplary embodiment, streaming that is adaptive to the streaming environment is possible since the client 130 is able to request the second media data again even while receiving the first media data about the same content.

The client 130 may estimate a streaming environment by using any method of estimating a streaming environment based on the bandwidth of the network 140 or the hardware resource that may be used by the server 120 or the client 130. For example, the client 130 may estimate the streaming environment based on a time stamp and a bit error rate (BER) of received media data. The streaming environment may be determined to be deteriorated when media data is received slower than a reproduction speed by checking time stamps of the received media data. Alternatively, the streaming environment may be determined to be deteriorated when BERs of the received media data are increased.

When the client 130 requests the server 120 to transmit at least one of the media data according to the streaming environment, the server 120 transmits the requested media data to the client 130. The server 120 may transmit the requested media data to the client 130 as an HTTP response to the HTTP request.

Each media data may include at least one of a plurality of segments generated by encoding content in different qualities and dividing the encoded content. In other words, each media data generated by encoding the content by the encoding device 110 may include at least one segment divided based on time. The server 120 transmits the content by dividing the content into the plurality of segments and respectively transmitting the plurality of segments, instead of encoding the content in one stream and continuously transmitting the content. The plurality of segments may be generated by dividing the content into predetermined time units, such as units of 10 or 20 seconds. The time that is the basis for dividing the content may be set based on a group of pictures (GOP). Media data corresponding to pictures of one or more GOPs may be set as one segment.

For example, when content is streamed having two qualities, the first media data may include at least one segment generated by encoding the content to have a first quality and dividing the encoded content based on time, and the second media data may include at least one segment generated by encoding the content to have a second quality and dividing the encoded content based on time.

The adaptive streaming is possible by dividing each media data based on time. For example, when streaming starts, the server 120 transmits a segment corresponding to 0 to 20 seconds of the first media data that is of low quality. Then, when it is determined that the streaming environment is improved after 20 seconds and the client 130 requests media data that is of higher quality, the server 120 may transmit a segment corresponding to 20 to 40 seconds of the second media data that is of the high quality. Since media data is divided into a plurality of segments based on time, segments of different media data may be transmitted according to a streaming environment, even during streaming.

Figure 2A:
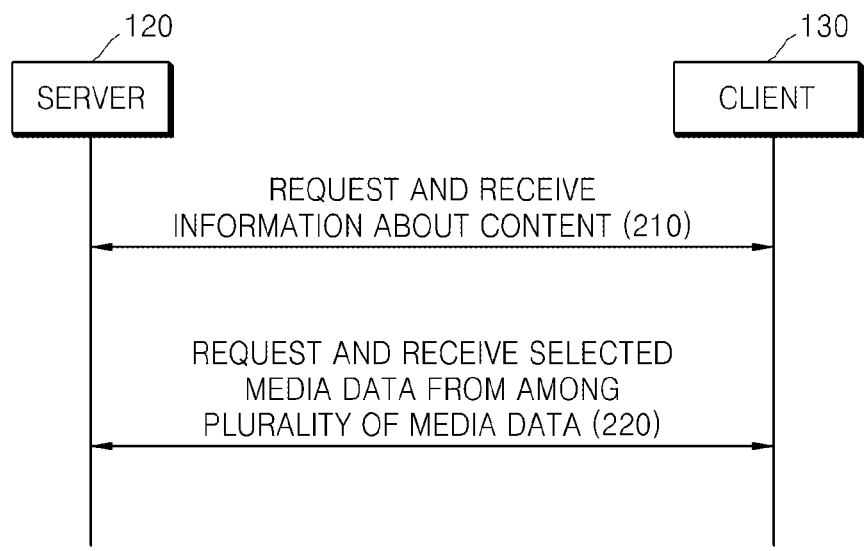
FIGS. 2A and 2B are flowcharts for describing streaming methods according to exemplary embodiments.

FIG. 2A is a flowchart for describing a streaming method according to an exemplary embodiment.

Referring to FIG. 2A, the client 130 transmits a request to the server 120 to transmit information about predetermined content, in operation 210. In particular, when a user of the client 130 selects the predetermined content from a user interface displayed on a screen of the client 130, the client 130 requests the server 120 to transmit information about the selected content. The client 130 may transmit an HTTP request requesting the server 120 to transmit information about predetermined content.

Upon receiving the request from the client 130, the server 120 transmits the information about the predetermined content to the client 130. The server 120 may transmit the information about the predetermined content as an HTTP response to the HTTP request to the client 130. The information about the predetermined content may be a content access descriptor (CAD) according to an open internet protocol television (IPTV) forum (OIPF) standard. The information about the predetermined content will now be described in detail with reference to FIG. 3.

Figure 3:
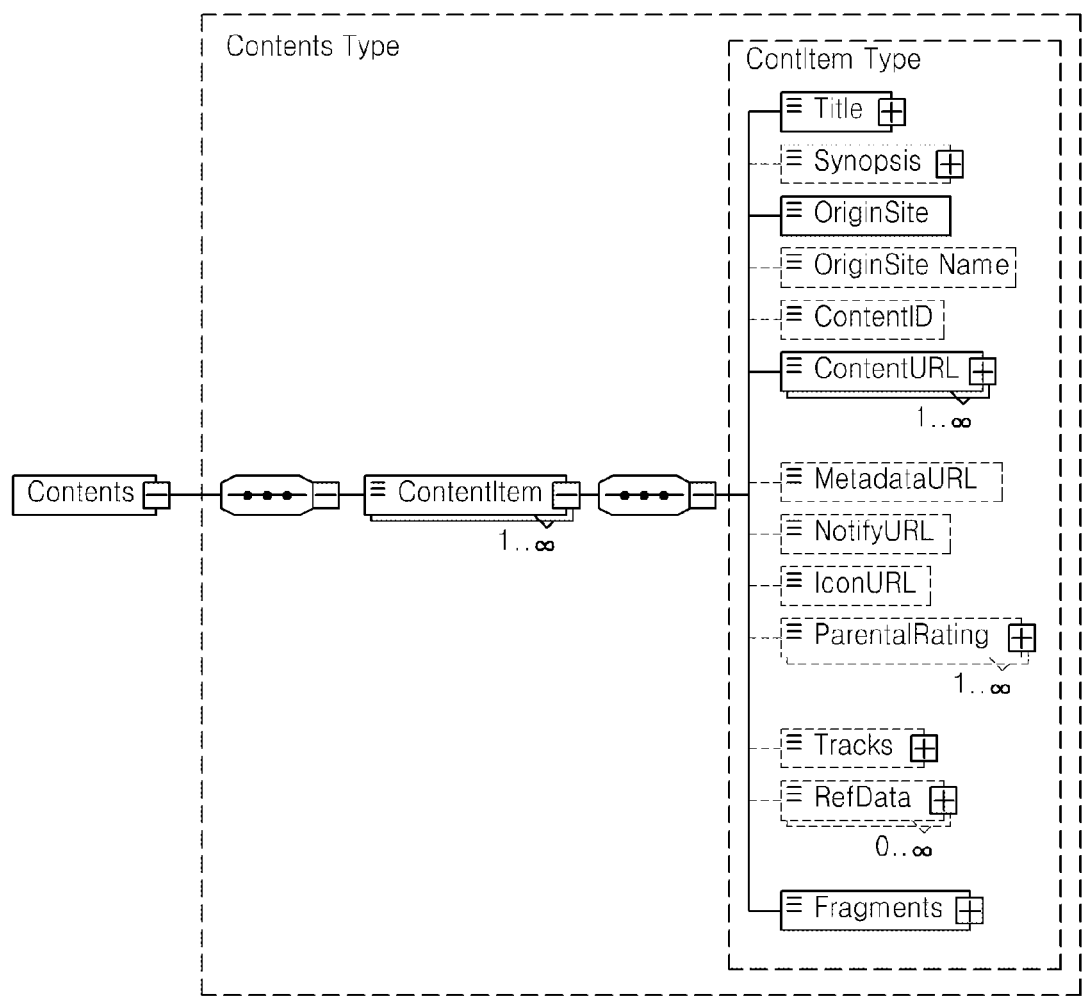
FIG. 3 is a schema of a file including information about content, according to an exemplary embodiment.

FIG. 3 is a schema of a file including information about content, according to an exemplary embodiment. The file may be a CAD, and may be an eXtensible Markup Language (XML) file. A tag and an attribute are separately described, but an item defined by a tag can be defined by an attribute or an item defined by an attribute can be defined by a tag.

Referring to FIG. 3, the information about content may include "Title", "Synopsis", "OriginSite", and "ContentURL" tags.

Since the related art streaming of media data generates one media data by encoding one content to have a predetermined quality, related art information (specifically, CAD according to OIPF) about content does not include information about a plurality of media data generated by encoding the content to have different qualities.

However, the information about content, according to the current exemplary embodiment, includes information about a plurality of media data generated by encoding one content to have different qualities, and corresponds to "Tracks", "RefData", and "Fragments" tags in FIG. 3.

FIG. 4A illustrates information for defining a plurality of media data, according to an exemplary embodiment.

Referring to FIG. 4A, a "Tracks" tag is information for classifying a plurality of media data generated by encoding content to have different qualities. The "Tracks" tag includes an "ID" attribute, a "Type" attribute, and a "Bitrate" attribute assigned to each media data.

The "ID" attribute defines identifiers sequentially given to the plurality of media data, and the "Type" attribute defines whether media data corresponds to audio data, video data, video/audio data, or subtitle data. When the "Type" attribute is "Packed", the media data is video/audio data, and when the "Type" attribute is "Video", the media data is video data. The "Bitrate" attribute defines a bit rate used to encode the media data.

FIG. 4B illustrates information about a header of media data, according to an exemplary embodiment.

Referring to FIG. 4B, a "RefData" tag includes a "Type" attribute and an "ID" attribute. The "Type" attribute defines a media format of a header. For example, when the "Type" attribute is "HEAD-TS", the header is a header of a transport stream format. The "ID" attribute defines a media data of a header. When the "ID" attribute is "1", the header is a header of media data having a media data ID of "1". Also, the "RefData" tag includes information pointing to a header, and an "URL" tag defines a location of a header, i.e., a URL of a header.

The "RefData" tag is a selective element. The "RefData" tag is included in information about content only when a header is separated from media data and exists as a separate file, and may not be included in the information about content when the header is combined with the media data.

FIG. 4C illustrates information about at least one segment included in each of a plurality of media data, according to an exemplary embodiment.

Referring to FIG. 4C, a "Fragment" tag, which is a sub tag of a "Fragments" tag, includes the information about at least one segment included in each of the plurality of media data.

The "Fragments" tag includes a "NextFragmentsXMLURL" attribute. When following content is continuously streamed, after streaming of one content is completed, such as in the case of live streaming, the following content may be seamlessly streamed only when the client 130 is aware of information about the following content. Accordingly, the "Fragments" tag defines the information about the following content as the "NextFragmentsXMLURL" attribute. URLs of the plurality of media data with respect to the following content may be defined as the "NextFragmentsXMLURL" attribute.

The "Fragment" tag includes information about at least one segment of current content. Referring to FIG. 4C, URL information of "slice1-1.as" constituting a first segment generated by encoding content in a first quality as first media data is defined by a "URL" tag, and an ID of a corresponding header is defined by a "RefPointer" tag. Also, a starting time of the first segment is defined by a "StartTime" attribute, and a duration time of each segment is defined by a "Duration" attribute. A quality of the first media data is defined by a "BitRate" attribute.

In FIG. 4C, the "Fragments" tag shows each media data including only one segment. However, as described above with reference to FIG. 1, when each media data is divided into a plurality of segments, one "Fragments" tag may include information about at least two segments.

Referring back to FIG. 2A, the client 130 requests the server 120 to transmit at least one of the plurality of media data, in operation 220. The plurality of media data are generated by encoding one content to have different qualities. The client 130 selects at least one media data encoded to have a quality suitable for a streaming environment from among the plurality of media data, and requests the server 120 for the selected at least one media data. The client 130 may transmit an HTTP request to the server 120 based on information about the plurality of media data, which is included in the information about the content.

As described with reference to FIG. 4C, the information about the content may include a "Fragments" tag. Accordingly, the client 130 requests the server 120 to transmit selected media data based on URL information included in the "Fragments" tag.

The server 120 transmits the media data according to the request of the client 130. The server 120 may transmit at least one segment of the requested media data to the client 130. The server 120 may transmit media data requested as an HTTP response with respect to an HTTP request to the client 130.

Figure 2B:
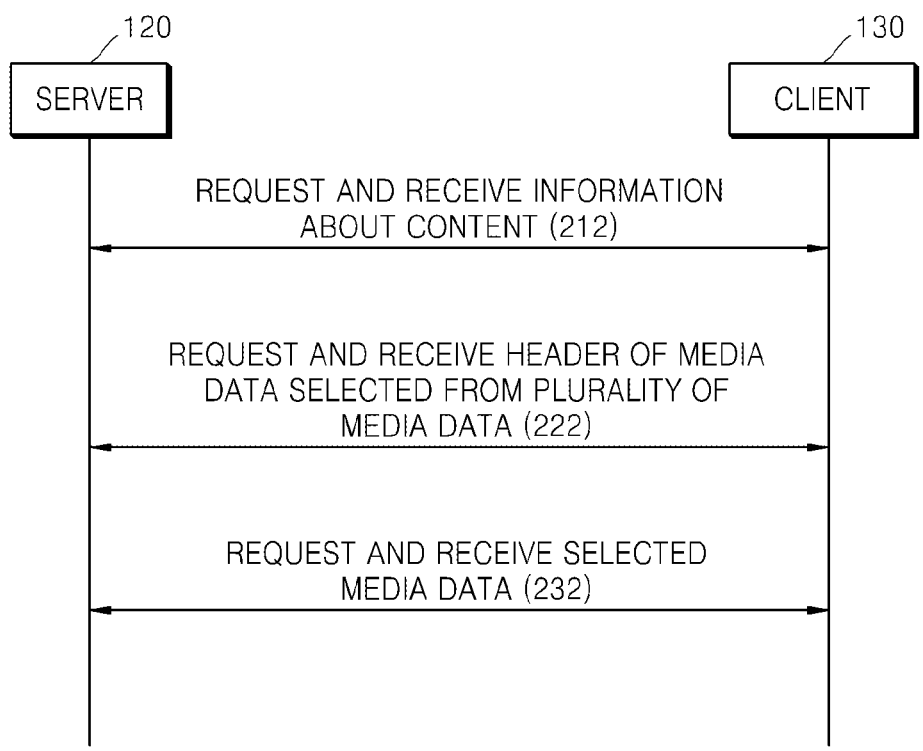

FIG. 2B is a flowchart for describing a streaming method according to another exemplary embodiment. FIG. 2B illustrates the streaming method when a header exists as a separate file from media data.

Referring to FIG. 2B, the client 130 requests the server 120 to transmit information about predetermined content, in operation 212, and the server 120 transmits the information about content. Operation 212 corresponds to operation 210 of FIG. 2A. The information about content including the "RefData" tag described above with reference to FIG. 4B is received.

In operation 222, the client 130 requests a header of selected media data from among a plurality of media data, based on the information about content received in operation 212. At least one media data suitable for a streaming environment is selected from among the plurality of media data based on the information about content received in operation 212, and a header of the selected at least one media data is requested. The header of the selected at least one media data is requested by referring to the "RefData" tag included in the information about content received in operation 212.

The server 120 transmits the requested header to the client 130. A header file may be transmitted to the client 130, and may be an XML file.

In operation 232, the client 130 requests the server 120 to transmit selected media data based on the information about content received in operation 212 and the header received in operation 222. The client 130 requests the server 120 to transmit at least one segment generated by dividing media data based on time, and the server 120 transmits the requested at least one segment to the client 130.

Figure 5A:
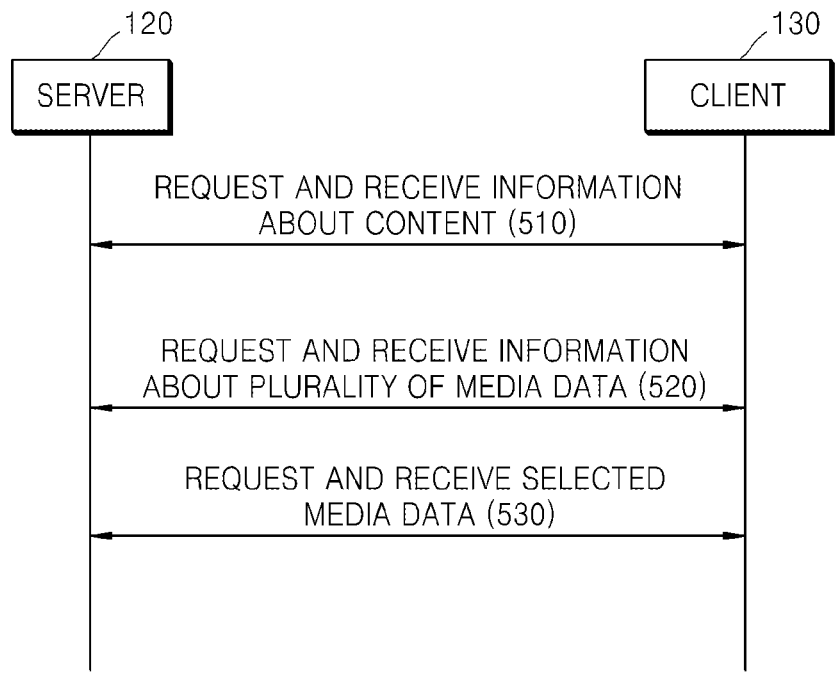
FIGS. 5A and 5B are flowcharts for describing streaming methods according to other exemplary embodiments.

FIG. 5A is a flowchart for describing a streaming method according to another exemplary embodiment.

Referring to FIG. 5A, the client 130 requests the server 120 to transmit information about predetermined content, in operation 510, and the server 120 transmits the information about content. The client 130 transmits an HTTP request for requesting the server 120 to transmit the information about content, and receives the information about content as an HTTP response to the HTTP request. The information about content may be an XML file. The information about content received by the client 130 in operation 510 differs from the information about content received by client 130 in operation 210 of FIG. 2, and the differences will be described with reference to FIGS. 6 and 7.

Figure 6:
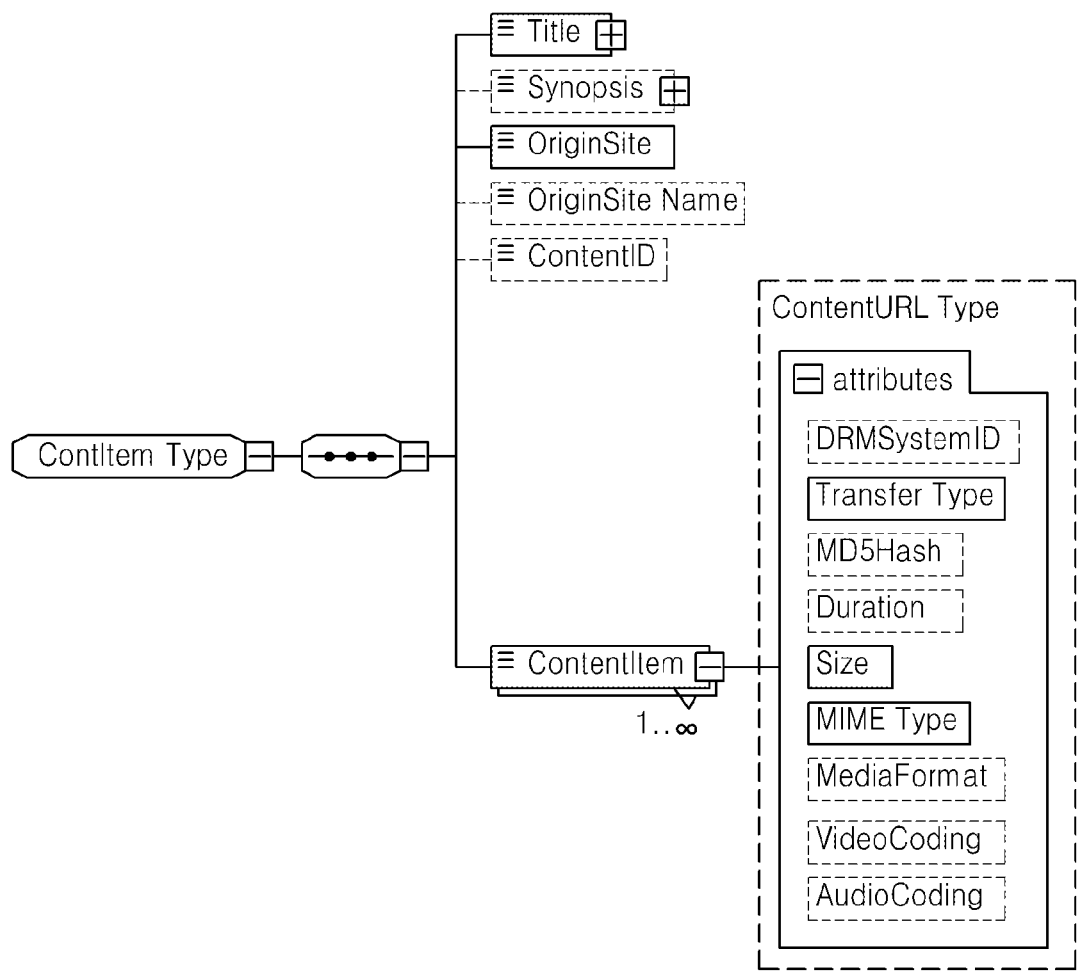
FIG. 6 is a schema of a file including information about content, according to another exemplary embodiment.

FIG. 6 is a schema of a file including information about content, according to another exemplary embodiment.

Referring to FIG. 6, the information about content according to the current exemplary embodiment may include "Title", "Synopsis", "OriginSite", and "ContentURL" tags, similar to FIG. 3.

However, in FIG. 3, the information about content includes the information about the plurality of media data by including the "Tracks", "RefData", and "Fragments" tags, whereas in FIG. 6, instead of including the information about the plurality of media data, the information about content only defines a URL of a file (hereinafter, referred to as a media presentation description), including the information about the plurality of media data. The "ContentURL" tag may define the URL of the media presentation description.

Compatibility with various media data formats may be maintained while performing streaming that is adaptive to a streaming environment by inserting the URL of the media presentation description into the information about content as shown in FIG. 6, without largely changing related art schema of the file containing the information about content.

As shown in FIG. 6, the information about content may only include information related to the streaming method, and not include the information about the plurality of media data. In other words, the "ContentURL" tag may include a "MediaFormat" attribute defining a format of media data used during streaming, and a "MIMEType" attribute defining a type of media data.

Specifically, the "ContentURL" tag may include a "TransferType" attribute, which defines a service to which streaming of content is related. The "TransferType" attribute may define whether the streaming of content is related to a Content on Delivery (CoD) service, a live service, an adaptive streaming live service, or an adaptive streaming CoD service.

FIG. 7 illustrates information about content according to an exemplary embodiment. FIG. 7 may be a CAD according to the OIPF standard.

Referring to FIG. 7, the information about content generated according to the schema of FIG. 6 may define a URL of a media presentation description in a "ContentURL" tag. http://asexample.com/vod/movies/18888/Meta/Main-Meta.xml is the URL of the media presentation description. Also, as described with reference to FIG. 6, the "MediaFormat" attribute, the "MIMEType" attribute, and the "TransferType" attribute may be defined in the "ContentURL" tag.

Referring back to FIG. 5A, in operation 520, the client 130 requests the server 120 for the information about the plurality of media data, based on the information about content received in operation 510. The client 130 may request a media presentation description to the server 120 through an HTTP request, and may receive the media presentation description as an HTTP response.

The information about content received by the client 130 from the server 120 in operation 510 may include the URL of the media presentation description as described with reference to FIGS. 6 and 7, and thus the client 130 requests and receives the media presentation description from the server 120 by referring to the "ContentURL" tag of the information about content. The media presentation description will now be described in detail with reference to FIGS. 8A and 8B, and FIGS. 9A through 9H.

Figure 8A:
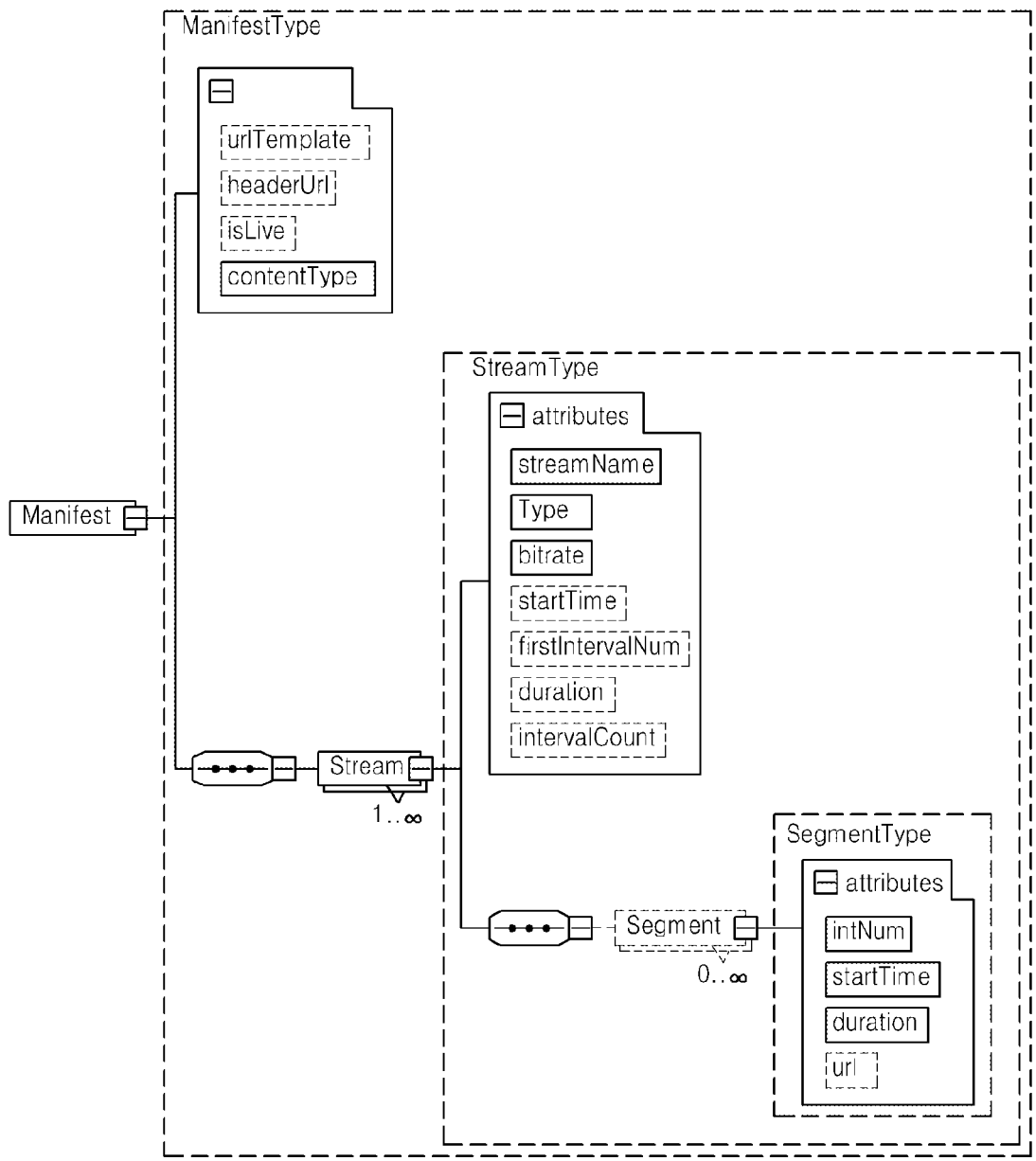
FIGS. 8A and 8B are schemas of a media presentation description according to exemplary embodiments.
Figure 8B:
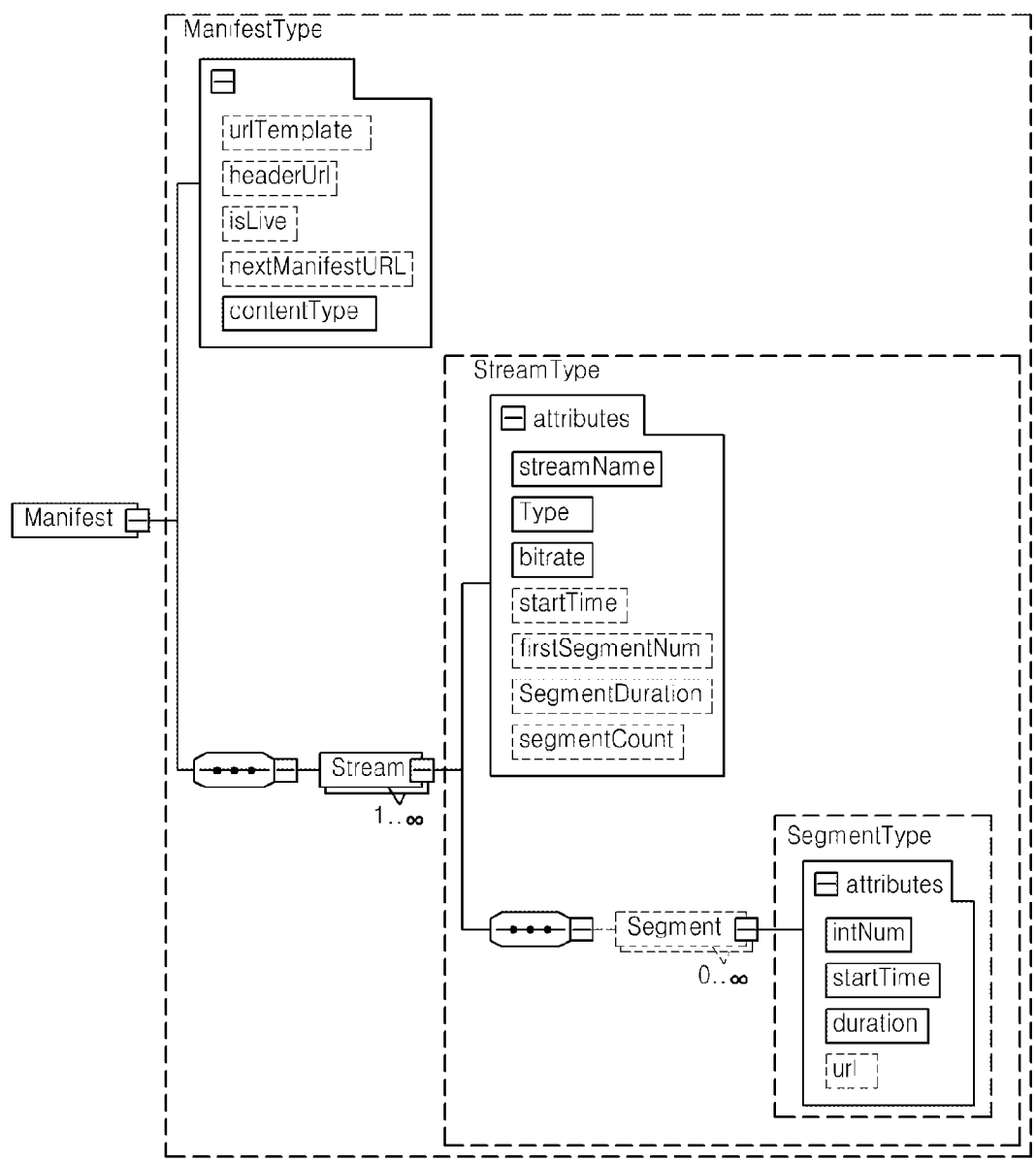

FIGS. 8A and 8B are schemas of a media presentation description according to exemplary embodiments. The media presentation description may comply with the OIPF standard.

Referring to FIG. 8A, the media presentation description according to the current exemplary embodiment includes a template tag about URLs of a plurality of media data, a tag for defining a location of a header, a tag for defining to which service the streaming is related to, a tag for defining a container format of media data, and a tag for defining the plurality of media data.

An "urlTemplate" tag defines a common portion of the URLs of the plurality of media data. For example, if "http://example.com/vod/movie/18888/Track/{TrackID}/Segments/{SegmentID}" is a URL template, a URL of media data may be defined by respectively substituting an ID of each media data and an ID of at least one segment included in each media data for "TrackID" and "SegmentID".

A "headerUrl" tag corresponds to the "RefData" tag described with reference to FIG. 4B. In other words, the "headerUrl" tag defines URLs of headers of the plurality of media data.

An "isLive" tag defines a service related to streaming. For example, when the "isLive" tag is defined as "Live", the streaming is related to a live service, and when the "isLive" tag is defined as "CoD", the streaming is related to a CoD service.

A "contentType" tag defines a container format of media data used during streaming. The "contentType" tag may indicate whether the container format is an MP4 format or an MPEG2-TS format. The container format is an MP4 format or an MPEG2-TS format herein. However, any container format for transmitting media data may be used. For example, the "contentType" tag may define that the container format complies with an MPEG Media Transport (MMT) standard.

A "Stream" tag is generated for each media data and defines each media data. In order to define each media data generated by encoding one content to have different qualities, the "Stream" tag includes a "streamName" attribute, a "type" attribute, a "bitrate" attribute, a "startTime" attribute, a "firstIntervalNum" attribute, a "duration" attribute, and an "intervalCount" attribute.

The "streamName" attribute defines a name of media data, and may be an ID of media data. The "type" attribute defines a type of media data, wherein it is defined whether the media data is audio data, video data, or audio/video data. When media data only includes data about an I-frame for a trick play, such information may be defined in the "type" attribute.

The "Bitrate" attribute defines a bit rate of media data, the "startTime" attribute defines a time stamp for specifying a starting time of media data, and the "firstIntervalNum" attribute defines a number of a segment that initially starts.

The "duration" attribute defines a duration time of a segment included in media data, and the "intervalCount" attribute defines a total number of at least one segment included in media data.

The "Segment" tag is a sub tag of the "Stream" tag, and as described above, when media data includes at least one segment generated by encoding content in a predetermined quality and dividing the encoded content based on time, each of the at least one segment is defined.

The "IntNum" attribute defines a number of a segment, and the "StartTime" tag defines a starting time of a corresponding segment. The "Duration" tag defines a duration time of a corresponding segment, and the "url" defines a URL of a corresponding segment.

The "Segment" tag is a selective tag, and may not be included in the media presentation description if the information about at least one segment included in the media data can be inferred from other attributes of the "Stream" tag. In other words, when content of the "Segment" tag can be inferred from the "startTime", "firstIntervalNum", "duration", and "intervalCount" attributes defined in the "Stream" tag, the "Segment" tag need not be included in the media presentation description. Also, a "url" attribute of the "Segment" tag may not be required if a predetermined template is defined in the "urlTemplate", and the URLs of segments are inferred by substituting each ID of the plurality of media data and an ID of at least one segment included in each media data with the defined predetermined template.

However, on the other hand, attributes of the "Segment" tag are separately defined for each segment, if the attributes of the "Segment" tag cannot be inferred from other attributes of the "Stream" tag. The attributes of the "Segment" tag may not be inferred if duration times of segments are different. When duration times are different, the duration times of segments included in media data cannot be inferred from the attributes of the "Stream" tag, and thus the duration times of the segments may be each set by using a "duration" attribute of the "Segment" tag. When the duration times of the segments are different, starting times of continuous segments are also different. For example, when a duration time of a first segment of first media data is different from a duration time of a second segment of the first media data, a starting time of the second segment and a starting time of a third segment cannot be inferred from the "Stream" tag. Accordingly, a starting time of each segment may be defined by a "startTime" attribute.

The duration times and/or starting times may be defined by using a sub tag of the "Segment" tag, instead of using the "duration" attribute and the "startTime" attribute of the "Segment" tag. For example, a "Url" tag constituting a sub tag of the "Segment" tag may be set, and a duration time may be defined as an attribute of the "Url" tag, such as "<Url=www.example.com/~/segment.ts, duration=10/>".

According to another exemplary embodiment, duration time may be defined based on a difference between duration times of continuous segments. An upper tag may define a default duration time, and the "Url" tag constituting the sub tag may define only a difference between the default duration time and an actual duration time for each segment. As described above, the "Url" tag constituting the sub tag of the "Segment" tag may be defined as "<Url=www.example.com/~/segment.ts, duration=difference/>". "Difference" denotes a difference between the default duration time and the actual duration time.

When a default duration time of a corresponding segment is defined to be 10 minutes by using the "Stream" tag or the "Segment" tag, and the "Url" tag constituting the sub tag is defined to be "<Url=www.example.com/~/segment.ts, duration=2/>", a duration time of the corresponding segment may be defined to be 10+2=12 minutes.

Referring to FIG. 8B, the media presentation description according to another exemplary embodiment may further include a "nextManifestURL" tag. As described above, when following content is continuously streamed after streaming of one content is completed, such as in the case of live streaming or advertisement insertion, the client 130 requires to pre-know information about the following content so as to stream the following content seamlessly. Accordingly, a URL of a media presentation description of the following content to be streamed after current content may be defined by the "nextManifestURL" tag.

FIGS. 9A through 9H illustrate media presentation descriptions according to exemplary embodiments.

Referring to FIG. 9A, the media presentation description according to an exemplary embodiment includes a "URLTemplate" tag, a "RefDataURL" tag, and a plurality of tags respectively defining a plurality of media data.

The "URLTemplate" tag and the "RefDataURL" tag of FIG. 9A respectively correspond to the "urlTemplate" tag and the "RefDataURL" tag of FIGS. 8A and 8B.

An "ID" attribute, a "Type" attribute, a "BitRate" attribute, a "StartTime" attribute, a "SegmentDuration" attribute, a "SegmentStartID" attribute, and a "SegmentCount" attribute of FIG. 9A respectively correspond to the "streamName" attribute, the "type" attribute, the "bitrate" attribute, the "startTime" attribute, the "duration" attribute of the "Stream" tag, the "firstIntervalNum" attribute of the "Stream" tag, and the "intervalCount" attribute of FIGS. 8A and 8B.

The media presentation description of FIG. 9A includes information about three video data generated by encoding content to have different qualities, information about one audio data, and information about media data generated by encoding only I-frames for a trick play.

Referring to FIG. 9B, the media presentation description according to an exemplary embodiment further includes a "NextAdaptiveControlURL" tag. The "NextAdaptiveControlURL" tag corresponds to the "nextManifestURL" tag of FIG. 8B. Accordingly, a URL of a media presentation description of following content to be reproduced after current content may be defined by the "NextAdaptiveControlURL" tag.

FIG. 9C shows a media presentation description of the following content, when the URL of the media presentation description of the following content to be reproduced after the current content is defined by the "NextAdaptiveControlURL" tag of FIG. 9B. Comparing the media presentation descriptions of FIGS. 9B and 9C, a "StartTime" attribute is different from the media presentation description of the current content of FIG. 9B, since the media presentation description of FIG. 9C is for the following content.

FIGS. 9D and 9E illustrate media presentation descriptions for selectively controlling high quality video reproduction that a user want to perform. FIG. 9D illustrates the media presentation description when a plurality of media data are generated by encoding one content to have 5 different qualities. Here, the media presentation descriptions of FIGS. 9D and 9E are different in a tag including information about video encoded to have high quality, i.e., a "StartTime" attribute and a "SegmentCount" attribute of media data having an "ID" attribute of "5".

The server 120 selectively transmits the media presentation description of FIG. 9D or the media presentation description of FIG. 9E according to a user rating of the client 130. When the user rating of the client 130 is high (for example, when the client 130 is a paid user), the media presentation description of FIG. 9D is transmitted so that high quality video is freely reproduced, and when the user rating of the client 130 is low (for example, when the client 130 is a free user), the media presentation description of FIG. 9E is transmitted so that segments defined by the "SegmentCount" attribute are reproduced from a time defined by the "StartTime" attribute in high quality video.

FIG. 9F illustrates a media presentation description when an advertisement is inserted into content. Referring to FIG. 9F, the media presentation description may include information about advertisement content and main content, which have different "StartTime" attributes. The media presentation description may include information about advertisement content, which is reproduced from "00:00:00" to "00:02:00" at a bit rate of "500000", and information about main content, which is reproduced from "00:02:00" at bit rates of "1000000", "2000000", "3000000", or "4000000". The media presentation description of FIG. 9F may be transmitted from the server 120 to the client 130 if the server 120 provides the advertisement content to the client 130 by encoding the advertisement content to have one bit rate, and provides the main content, which have a different "StartTime" attribute from the advertisement content, to the client 130 by encoding the main content in four different bit rates.

FIG. 9G illustrates a media presentation description including information about advertisement content, according to an exemplary embodiment. A server for providing main content and a server for providing advertisement content may be different. In other words, when the client 130 receives the main content from the server 120 of FIG. 5A and receives the advertisement content from a server other than the server 120, the media presentation description of FIG. 9G may include a URL of the advertisement content. As shown in FIG. 9G, the media presentation description may include the URL of the advertisement content that is encoded to have one quality.

FIG. 9H illustrates a media presentation description including language and subtitle information, according to an exemplary embodiment. Referring to FIG. 9H, audio data may include information about multiple languages. The media presentation description may include information about audio data of multiple languages, wherein an "ID" attribute is "4" or "5", or information about subtitles of multiple languages, wherein the "ID" attribute is "6" or "7".

Since not only the audio data, but also the subtitle may be divided into a plurality of segments according to time, the audio data and the subtitle may be changed to audio data and a subtitle of another language during streaming.

Referring back to FIG. 5A, the client 130 requests the server 120 to transmit at least one of the plurality of media data, in operation 530. The client 130 selects at least one media data that is encoded to have a quality suitable for the streaming environment by referring to the information about the plurality of media data, and requests the server 120 for the selected at least one media data. The client 130 may transmit an HTTP request for requesting the server 120 to transmit a predetermined media data. The server 120 transmits the media data according to the request of the client 130. Alternatively, the server may transmit at least one segment generated by encoding content to have a predetermined quality and dividing the encoded content based on time, to the client 130. The server 120 may transmit the requested media data to the client 130 as an HTTP response to the HTTP request.

Figure 5B:
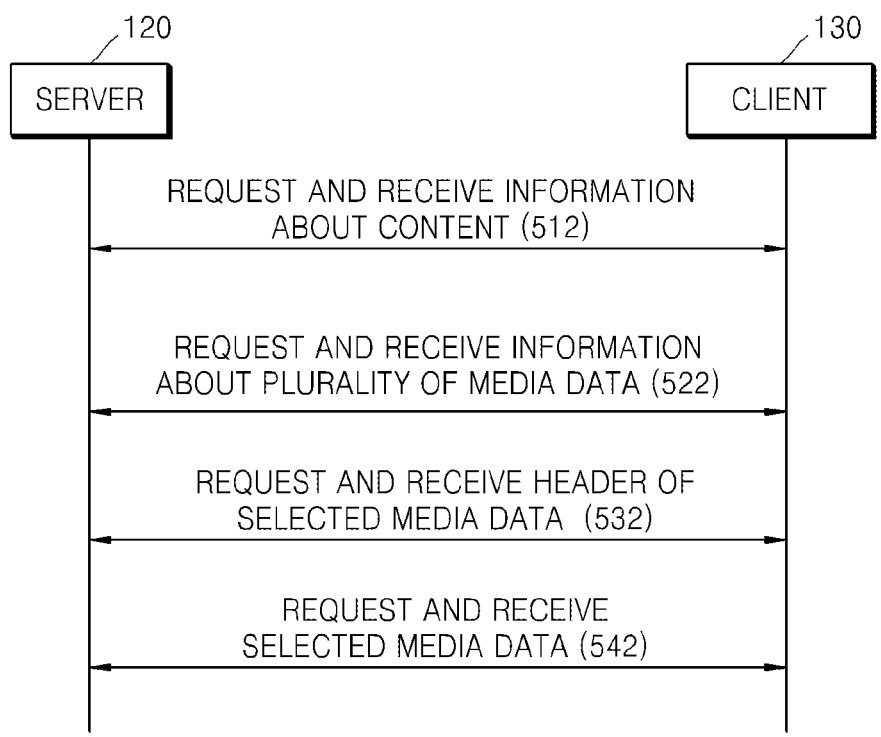

FIG. 5B is a flowchart for describing a streaming method according to another exemplary embodiment.

Referring to FIG. 5B, the client 130 requests the server 120 to transmit information about predetermined content, in operation 512, and receives the information about predetermined content from the server 120. The client 130 may transit an HTTP request for requesting the server 120 to transmit the information about predetermined content, and receive the information about predetermined content as an HTTP response to the HTTP request. The information about predetermined content may be included in an XML file.

In operation 522, the client 130 requests the server 120 to transmit information about a plurality of media data based on the information about predetermined content received in operation 512. The client 130 may request the server 120 for a media presentation description through the HTTP request, and receive the media presentation description as the HTTP response.

In operation 532, the client 130 requests a header of media data selected based on the information about a plurality of media data received in operation 522. At least one media data that is suitable to a streaming environment is selected from among the plurality of media data based on the information about the plurality of media data received in operation 522, and a header of the selected at least one media data is requested. The header of the selected at least one media data is requested by referring to the information about the plurality of media data received in operation 522. The server 120 transmits a file of the header of the selected at least one media data to the client 130 in response to the request of the client 130.

In operation 542, the client 130 requests the server 120 to transmit selected media data based on the information about the plurality of media data received in operation 522, and the header received in operation 532. The client 130 requests the server 120 to transmit at least one segment generated by encoding content to have a predetermined quality and dividing the encoded content based on time, and the server 120 transmits the requested at least one segment to the client 130.

Figure 10A:
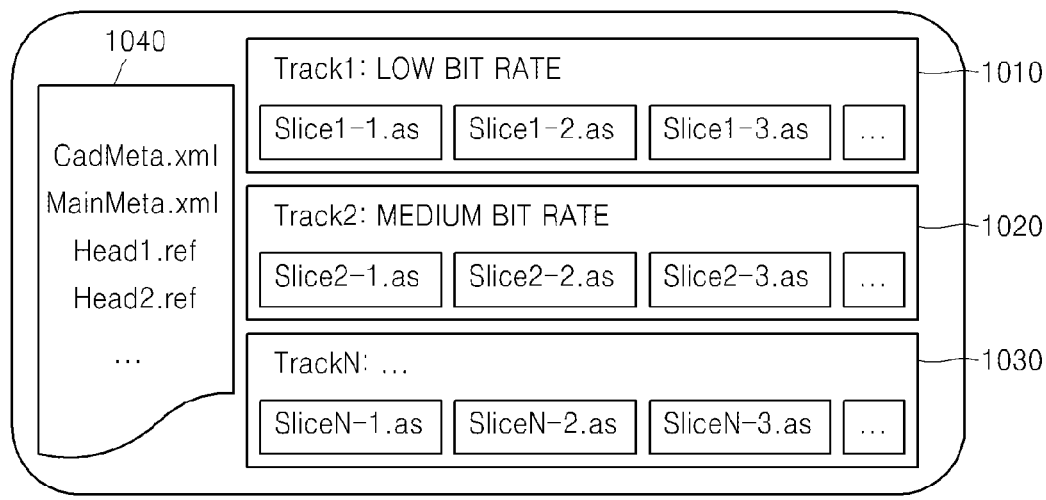
FIGS. 10A through 10C each illustrate a plurality of media data according to exemplary embodiments.
Figure 10B:
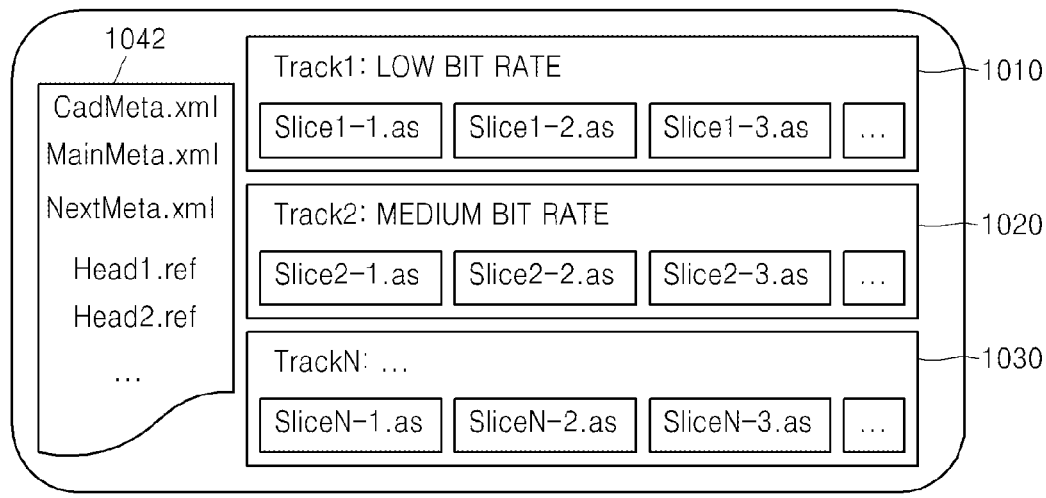
Figure 10C:
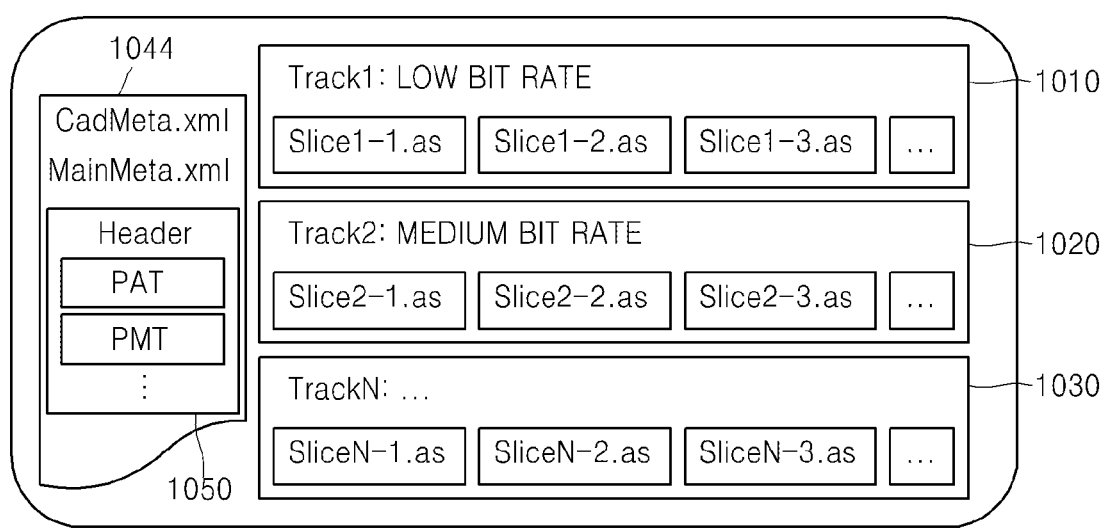

FIGS. 10A through 10C each illustrate a plurality of media data according to exemplary embodiments. FIGS. 10A through 10C each illustrate the plurality of media data included in the server 120 to perform the streaming methods according to FIGS. 5A and 5B.

Referring to FIG. 10A, the server 120 may include a plurality of media data 1010 through 1030 generated by encoding one content to have a plurality of different qualities, for streaming that is adaptive to a streaming environment. "Track1" through "TrackN" denote the plurality of media data 1010 through 1030. Also, each of the plurality of media data 1010 through 1030 may include at least one segment generated by dividing each of the plurality of media data 1010 through 1030 based on time. "Slice1-1.as", "Slice1-2.as", "Slice1-3.as", "Slice2-1.as", "Slice2-2.as", "Slice2-3.as", "SliceN-1.as", "SliceN-2.as", and "SliceN-3.as" denote at least one segment.

The server 120 may include information 1040 required for the client 130 to access the plurality of media data 1010 through 1030. The server 120 may include a "CadMeta.xml" file as information about content, a "MainMeta.xml" file as information about the plurality of media data 1010 through 1030, and a "Head1.ref" file, a "Head2.ref" file, etc. as header files of the plurality of media data 1010 through 1030. Here, the "Head1.ref" file may be a header file of the "Track1", and the "Head2.ref" file may be a header file of the "Track2".

The "CadMeta.xml" file may be a CAD file according to the OIPF standard, and the "MainMeta.xml" file may be the media presentation description described above. Also, the "Head1.ref" and "Head2.ref" files are selective elements, and may not exist when headers are included in the plurality of media data 1010 through 1030.

Referring to FIG. 10B, information 1042 required for the client 130 to access the plurality of media data 1010 through 1030 may further include a "NextMeta.xml" file. As described above, the "NextMeta.xml" file may be a media presentation description of a following content to be reproduced after current content. As described above, the media presentation description of the current content, i.e., the "MainMeta.xml" file, includes the URL of the media presentation description of the following content, and thus the client 130 may access the "NextMeta.xml" file based on the "MainMeta.xml" file.

Referring to FIG. 10C, header files of the plurality of media data 1010 through 1030 may exist in one header file 1050. Instead of existing for each of the plurality of media data 1010 through 1030, the header files may exist as one header file 1050 and may be included in information 1044 required to access the plurality of media data 1010 through 1030.

For example, when each of the plurality of media data 1010 through 1030 corresponds to an elementary stream, for example, an elementary stream according to MPEG-2, the header files of the plurality of media data 1010 through 1030 may be the header file 1050 including a program association table (PAT) and a program map table (PMT). At least one of the PAT and the PMT is separated from the plurality of media data 1010 through 1030 to prepare the header file 1050, and the media presentation description may include information pointing to the header file 1050. The information pointing to the header file 1050 may be URL information of the header file 1050 or information for specifying a packet including the header file 1050 in a MPEG-2 transport stream (TS). The header file 1050 including at least one of the PAT and the PMT is an initialization segment, and may be transmitted to the client 130 before segments including payload data, so as to initiate reproduction of the plurality of media data 1010 through 1030.

Referring back to operation 532 of FIG. 5B, the client 130 may obtain the information pointing to the header file 1050 by referring to the media presentation description, and may request the header file 1050 based on the information pointing the header file 1050. After requesting and receiving the header file 1050 based on the information pointing to the header file 1050, at least one of the plurality of media data 1010 through 1030 is selected based on at least one of the PAT and the PMT included in the header file 1050, and the selected at least one media data is requested from the server 120. The PAT and the PMT may be separated as the header file 1050 or included in the plurality of media data 1010 through 1030, but may include an entire list of elementary streams included in the plurality of media data 1010 through 1030 regardless of locations of the PAT and the PMT.

According to MPEG-2, packet IDs (PIDs) defined in the PAT and the PMT are different according to elementary streams. Accordingly, PIDs assigned to each of the plurality of media data 1010 through 1030 may be different. Alternatively, according to another exemplary embodiment, since the plurality of media data 1010 through 1030 generated by encoding one content to have different qualities are elementary streams of the same content, the same PID may be set.

When the plurality of media data 1010 through 1030 correspond to a plurality of elementary streams according to MPEG-2, each of segments included in the plurality of media data 1010 through 1030 may include at least one continuous packetized elementary stream (PES). However, one PES is included in one segment. In other words, one PES is not included in two different segments.

Since a plurality of media data are generated by encoding one content to have different qualities, presentation time stamps (PTSs) and/or decoding time stamps (DTSs) included in PESs of the plurality of media data may be aligned according to reproduction times. In other words, if an initial PES of first media data and an initial PES of second media data are content reproduced at the same time, a PTS and/or a DTS may be equally set.

Further, when the second media data is reproduced while reproducing the first media data by changing media data according to the streaming environment, the PTSs and/or the DTSs may be continuously aligned so that the first and second media data are continuously reproduced. In other words, when the second media data is reproduced while reproducing the first media data by changing media data, the PTS and/or the DTS of the last PES before the changing and the PTS and/or the DTS of the first PES after the changing may be continuously set.

The PTS and/or the DTS define a time stamp of video data. Accordingly, time stamps of the plurality of media data with respect to video data are aligned according to the reproduction times of the plurality of media data as described above. Such alignment of the time stamps based on the reproduction times may be equally applied to audio data. In other words, like the time stamps of the plurality of media data with respect to the video data, time stamps of the pieces media data with respect to the audio data may also be aligned according to the reproduction times for adaptive streaming.

Figure 11A:
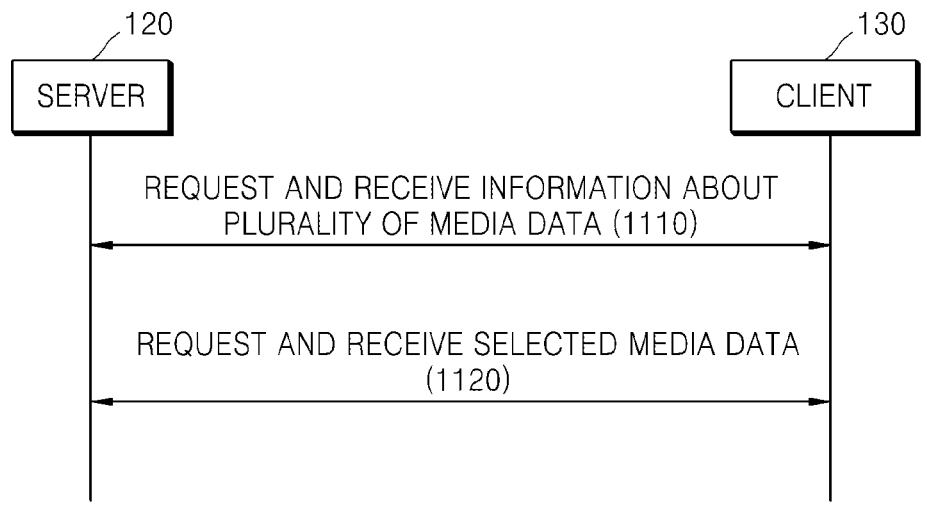
FIGS. 11A and 11B are flowcharts for describing streaming methods according to exemplary embodiments.

FIG. 11A is a flowchart for describing a streaming method according to another exemplary embodiment.

Referring to FIG. 11A, the client 130 requests information about a plurality of media data to the server 120, in operation 1110. The client 130 may request a media presentation description to the server 120 via an HTTP request, and may receive the media presentation description as an HTTP response. The client 130 requests the server 120 for and receives the information about the plurality of media data generated by encoding one content to have a plurality of different qualities, so as to perform streaming that is adaptive to a streaming environment. The streaming method of FIG. 11A is different from the streaming method of FIG. 5A as the information about the plurality of media data is requested and received without requesting and receiving information about content.

In operation 1120, the client 130 requests the server 120 to transmit at least one of the plurality of media data. The client 130 selects and requests at least one media data that is encoded to have a quality suitable for the streaming environment by referring to the information about the plurality of media data, and receives the requested at least one media data from the server 120.

Figure 11B:
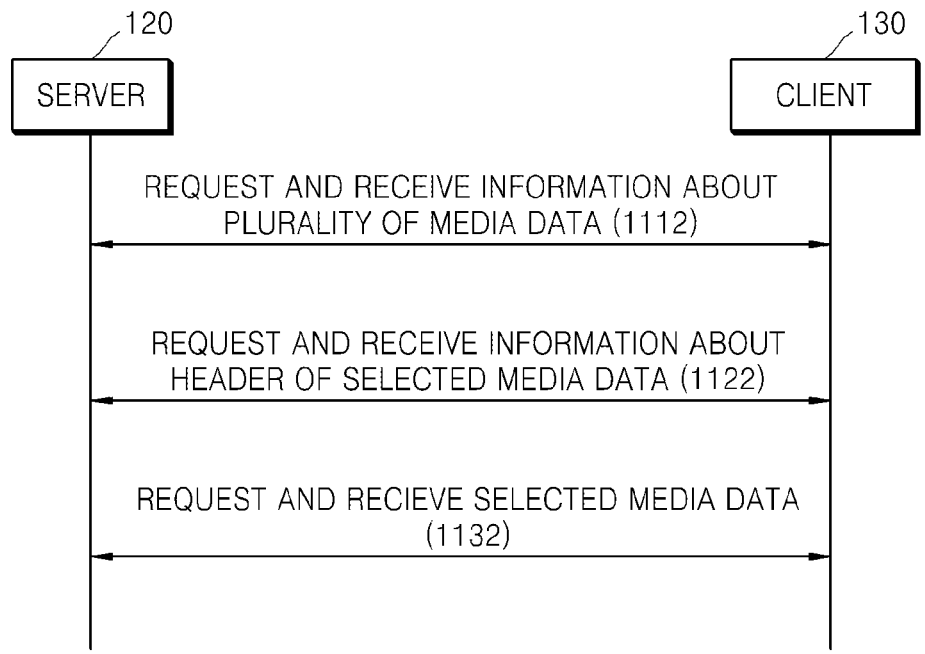

FIG. 11B is a flowchart for describing a streaming method according to another exemplary embodiment.

Referring to FIG. 11B, the client 130 requests the server 120 to transmit information about a plurality of media data and receives the information about the plurality of media data from the server 120 in response to the request, in operation 1112. The client 130 may request the server 120 for a media presentation description through an HTTP request, and receive the media presentation description as an HTTP response.

In operation 1122, the client 130 requests a header of selected media data based on the information about the plurality of media data received in operation 1112. The client 130 requests the header of media data selected according to a streaming environment by referring to the information about the plurality of media data received in operation 1112. In response to the request, the server 120 transmits a file including the header of the selected media data to the client 130.

In operation 1132, the client 130 requests the server 120 to transmit the media data selected based on the information about the plurality of media data received in operation 1112, and the header received in operation 1122. The client 130 requests the server 120 to transmit at least one segment generated by encoding content in a predetermined quality and dividing the encoded content based on time, and the server 120 transmits the requested at least one segment to the client 130.

Figure 12A:
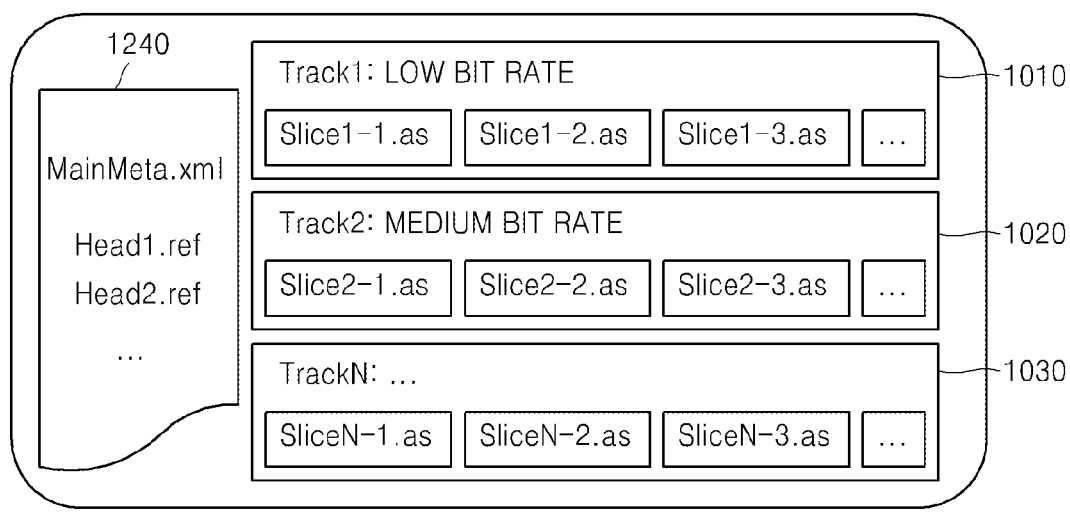
FIGS. 12A and 12C each illustrate a plurality of media data according to exemplary embodiments.
Figure 12B:
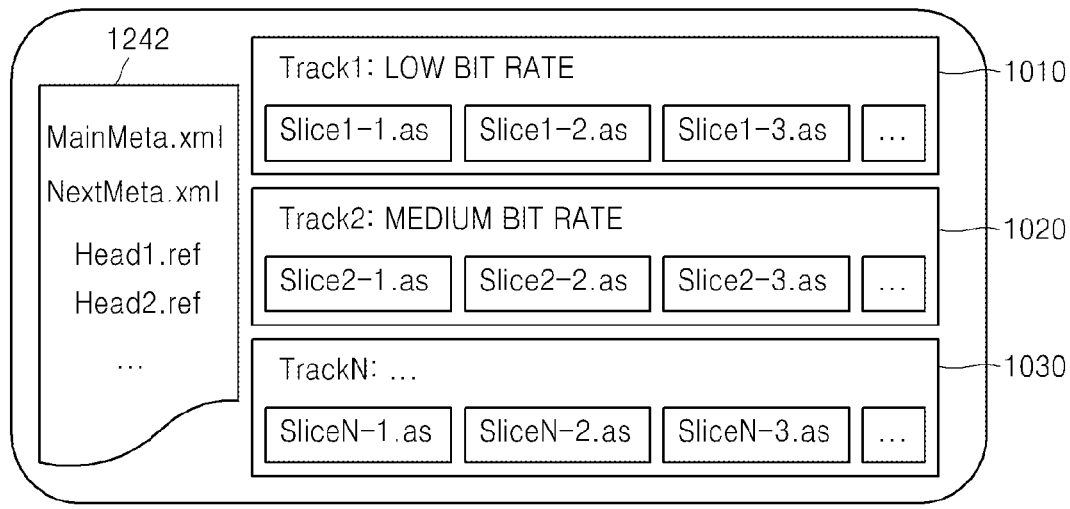
Figure 12C:
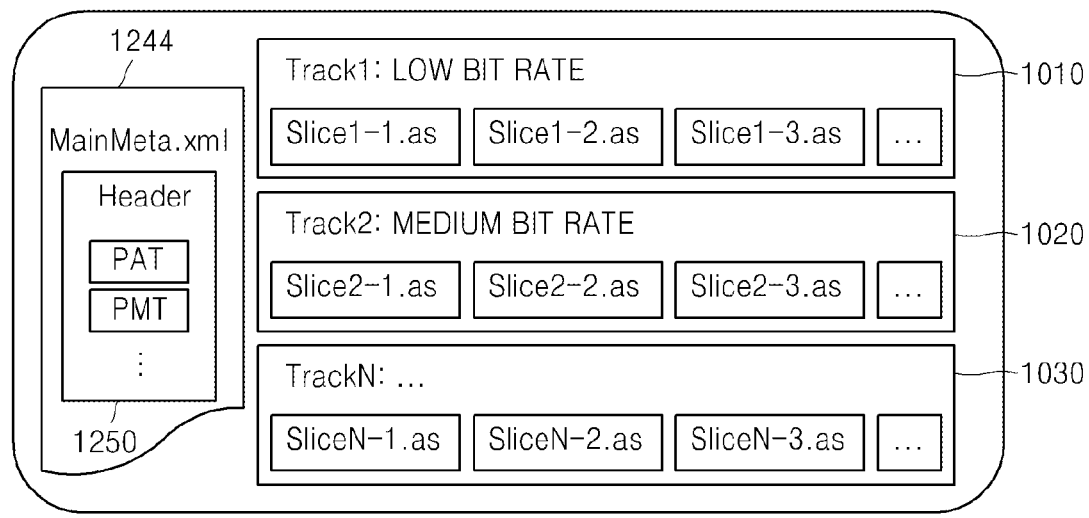

FIGS. 12A and 12C each illustrate a plurality of media data according to other exemplary embodiments. FIGS. 12A and 12B each illustrate the plurality of media data included in the server 120, which are used to perform the streaming methods of FIGS. 11A and 11B.

Referring to FIG. 12A, the server 120 may include the plurality of media data 1010 through 1030 generated by encoding one content to have the plurality of different qualities for streaming that is adaptive to a streaming environment, as shown in FIG. 10A.

Here, the plurality of media data 1010 through 1030 of FIG. 12A is different from the plurality of media data 1010 through 1030 of FIG. 10A in information 1240 required for the client 130 to access the plurality of media data 1010 through 1030, wherein the server 120 only includes information about the plurality of media data 1010 through 1030 and not information about content, unlike the exemplary embodiment of FIG. 10A. Here, the client 130 may receive the information about content from another entity instead of the server 120, and access the plurality of media data 1010 through 1030 included in the server 120 based on the received information about content.

Referring to FIG. 12B, information 1242 required for the client 130 to access the plurality of media data 1010 through 1030 may be prepared by further including a "Next-Meta.xml" file to the information 1240 of FIG. 12A.

Referring to FIG. 12C, the header files of the plurality of media data 1010 through 1030 may exist in one header file 1250. The header files do not exist for each of the plurality of media data 1010 through 1030, but may be included in information 1244 required to access the plurality of media data 1010 through 1030, as one header file 1250. The header file 1250 corresponds to the header file 1050 of FIG. 10C.

Figure 13:
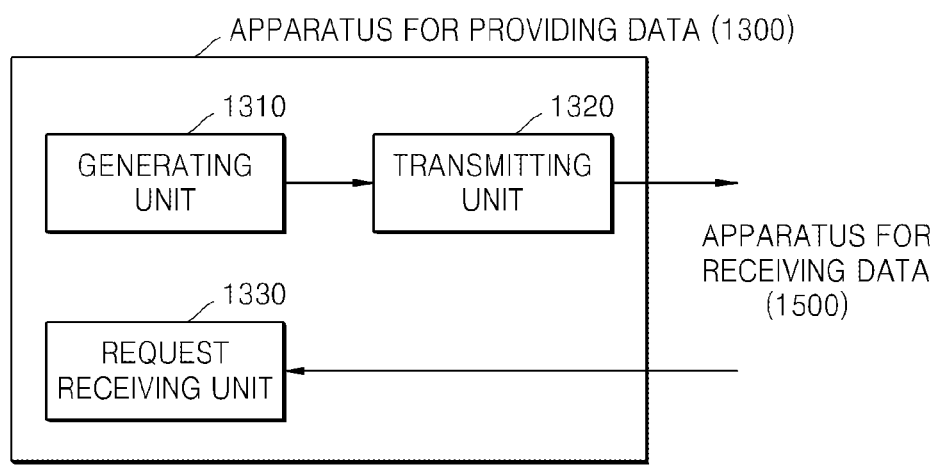
FIG. 13 is a block diagram of an apparatus for providing data according to an exemplary embodiment.

FIG. 13 is a block diagram of an apparatus 1300 for providing data according to an exemplary embodiment.

The apparatus 1300 for providing data according to the current exemplary embodiment may include a generating unit 1310, a transmitting unit 1320, and a request receiving unit 1330.

The generating unit 1310 generates additional information including information about a plurality of media data generated by encoding content to have different qualities. The additional information may be any type of data including information about a plurality of media data and may be, for example, the MPD described with reference to FIGS. 1 through 12. Hereinafter, for convenience of description, it is assumed that the additional information is a MPD.

The MPD includes access information for pieces of media data. The pieces of media data include at least one segment and the MPD includes access information for each segment. One MPD may include information about one entire media data; however, may only include information about some intervals. For example, the media data may be divided in a plurality of intervals according to a predetermined standard, and a plurality of MPDs corresponding to each interval may be generated. When a live streaming service is provided by using the media data and the MPD includes information about entire media data, a capacity of data increases and it is hard to search for information that a user desires. Accordingly, a plurality of MPDs corresponding to each interval may be generated.

Hereinafter, for convenience of description, two continuous intervals in the media data are called a first interval and a second interval, and MPDs including information about the first interval and the second interval are called a first MPD and a second MPD, respectively.

A method of determining an interval corresponding to a MPD may vary according to the exemplary embodiments.

Firstly, overlapping of continuous intervals may vary according to the exemplary embodiments.

In an exemplary embodiment, continuous intervals are overlapped each other. For example, at least one segment included at the end of the first interval may be overlapped with a start of the second interval. In this case, information about the segments located at an area where the first interval overlaps with the second interval is included in both the first MPD and the second MPD. When continuous intervals are overlapped each other, the second MPD is received before the first interval is completely processed and thus an apparatus 1500 for receiving data may secure spare time for processing the second interval. Such a way may be useful in particular when attributes of the first MPD and the second MPD are different from each other and thus synchronization of the first MPD with the second MPD is needed.

In another exemplary embodiment, continuous intervals are not overlapped each other. In this case, the second MPD is received at a point of time when the first interval is completely processed. Such a way may be useful in particular when attributes of the first MPD and the second MPD are the same as each other and thus synchronization of the first MPD with the second MPD is not needed.

Secondly, a standard to divide intervals may vary according to exemplary embodiments.

In an exemplary embodiment, intervals may be divided according to a program included in media data. For example, an interval, through which a first program is provided, may be set to a first interval, and an interval, through which a second program is provided, may be set to a second interval. In this case, the first interval and the second interval may have different lengths.

In another exemplary embodiment, the media data may be divided into intervals having the same time interval. For example, a first interval may be set from the start to '00:10:00' and a second interval may be set from '00:10:01' to '00:20:00'. In this case, the 1:1 mapping relationship may not be formed between the MPD and a program.

According to exemplary embodiments, compatibility between the first MPD and the second MPD may be or may not be possible.

In an exemplary embodiment, the first MPD may be compatible with the second MPD.

The first MPD is compatible with the second MPD when an attribute of the first MPD is the same as an attribute of the second MPD. More specifically, representations having the same ID in the first MPD and the second MPD have the same attributes so that a segment list included in the first MPD is the same as a segment list included in the second MPD. Accordingly, the apparatus 1500 for receiving data may immediately use the second MPD without a synchronization process for determining whether the attributes included in the second MPD correspond to the attributes of the first MPD.

The first MPD may be compatible with the second MPD when the first MPD and the second MPD are acquired through files having the same name. In this case, the first MPD and the second MPD may be acquired through the same URL.

In another exemplary embodiment, the first MPD may not be compatible with the second MPD.

The first MPD is not compatible with the second MPD when an attribute of the first MPD is different from an attribute of the second MPD. Accordingly, in the apparatus 1500 for receiving data, a synchronization process for determining whether the attributes included in the second MPD correspond to the attributes of the first MPD is required.

The first MPD may not be compatible with the second MPD when the first MPD and the second MPD are acquired through files having the different names. In this case, the first MPD and the second MPD may be acquired through the different URLs.

The first MPD may include at least one selected from the group consisting of renewal time information indicating a point of time when the first MPD is updated (or the time length that validation of the first MPD is secured), location information about the second MPD, an ID of program provided through the first interval, a start location of the first interval, and a completion location of the first interval.

Location information about the second MPD may be included in the first MPD only when the apparatus 1500 for receiving data does not identify the location information about the second MPD. For example, when the first MPD is compatible with the second MPD, location information may not be included in the first MPD. When the first MPD is not compatible with the second MPD, location information may be included in the first MPD.

The transmitting unit 1320 may include a first transmitting unit (not illustrated) and a second transmitting unit (not illustrated).

The first transmitting unit (not illustrated) transmits the MPDs.

The second transmitting unit (not illustrated) transmits at least one media data required by a user from among a plurality of media data by using a live streaming method.

The request receiving unit 1330 receives a request from a user. In response to the request from a user, the request receiving unit 1330 controls the first transmitting unit (not illustrated) to transmit the MPDs or the second transmitting unit (not illustrated) to transmit at least one media data.

Hereinafter, operations of the transmitting unit 1320 and the request receiving unit 1330 will be described according to time sequence.

Firstly, the first transmitting unit (not illustrated) transmits the first MPD to the apparatus 1500 for receiving data.

The apparatus 1500 for receiving data will request at least one of the plurality of media data based on the first MPD.

When the request to transmit the media data is received from the apparatus 1500 for receiving data, the request receiving unit 1330 controls the second transmitting unit (not illustrated) so as to transmit the media data required by a user in a live streaming method.

The apparatus 1500 for receiving data will request renewal of the first MPD after renewal time of the first MPD is identified based on the first MPD.

When the request to renew the first MPD is received from the apparatus 1500 for receiving data, the request receiving unit 1330 controls the first transmitting unit (not illustrated) so as to transmit the second MPD continued from the first MPD.

The apparatus 1500 for receiving data will continuously request desired media data based on the second MPD.

The request receiving unit 1330 controls the second transmitting unit (not illustrated) so as to continuously transmit media data desired by a user.

Figure 14:
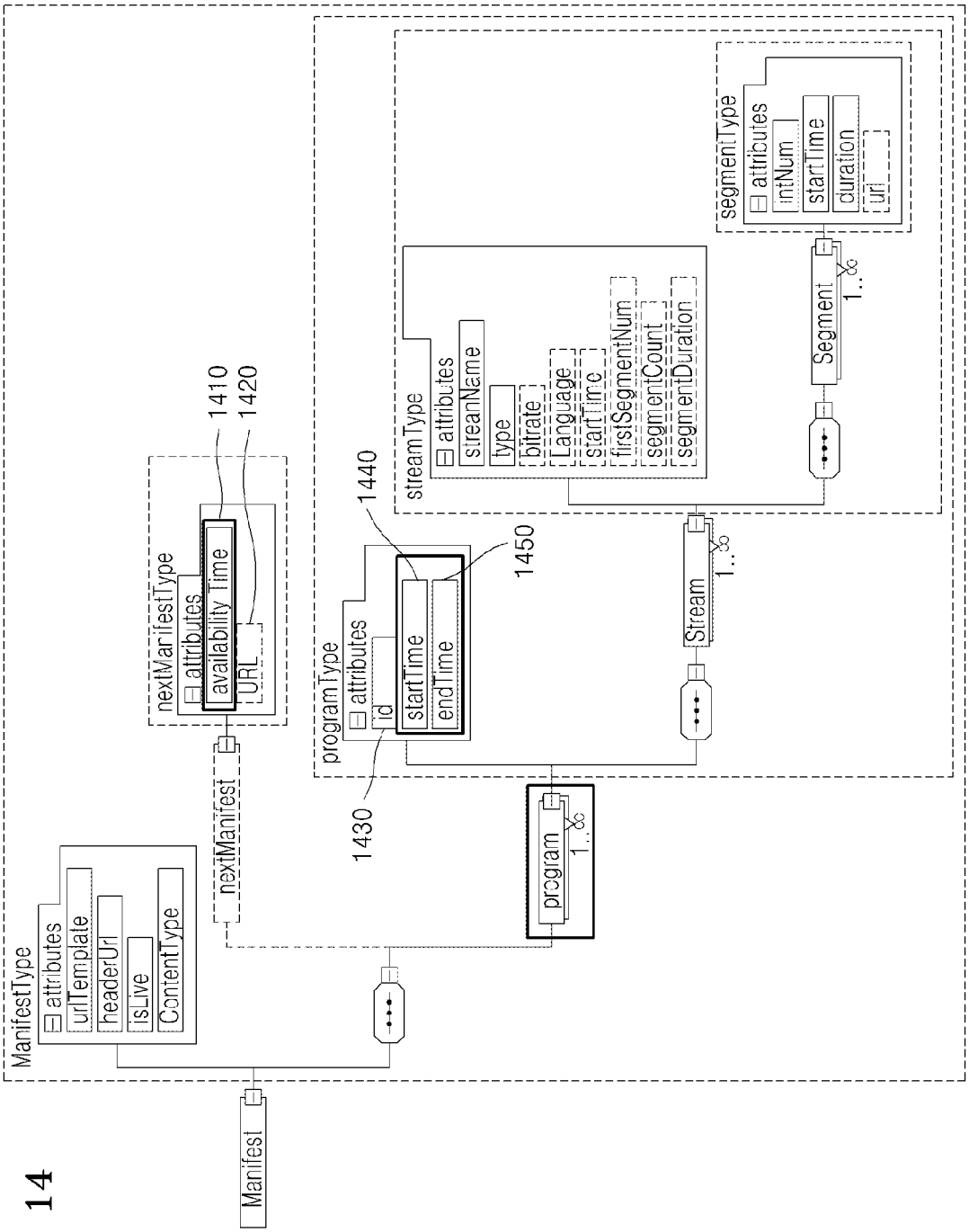
FIG. 14 illustrates a structure of a media presentation description (MPD) including renewal time information according to an exemplary embodiment.

FIG. 14 illustrates a structure of a MPD including renewal time information according to an exemplary embodiment.

A 'nextmanifest' field includes information about next MPD.

An 'availabiltyTime' field 1410 indicates a point of time when a MPD is to be renewed (that is, a point of time when next MPD is to be received).

The 'availabiltyTime' field 1410 may be indicated by an offset value from reference time for renewing a MPD (for example, reproduction time of a first segment corresponding to a MPD). Also, the 'availabiltyTime' field 1410 may indicate a point of time, when the MPD is renewed, with absolute time, such as minutes or seconds, or a number of a clock or segment.

The 'availabiltyTime' field in FIG. 19 indicates a point of time when a MPD is renewed based on a point of time when each interval starts, the 'availabiltyTime' field in FIG. 21 indicates a point of time when a MPD is renewed based on a point of time when a first interval in the media data starts, and the 'availabiltyTime' field in FIG. 23 indicates a number of a segment downloaded until a MPD is renewed after each interval starts.

A 'URL' field 1420 indicates a location of a next MPD.

A 'Program' field includes information about a program provided from an interval corresponding to a MPD. The program is a section obtained by classifying at least one media data according to a service or time. The media data includes at least one program. According to the exemplary embodiments, the program may be referred to as a period that is previously defined. That is, the program is an element formed by time unit and is a field that may represent content and type of a stream in various ways according to time.

An 'ID' field 1430 indicates identification information of a program. An exclusive ID in one media presentation is assigned to each program. A MPD may be used to divide and define each program by using a program ID.

A 'StartTime' field 1440 indicates a start time of a corresponding program or a star time of an interval that corresponds to a MPD. For example, the 'StartTime' field 1440 about a first program in the media data has '0' and the 'StartTime' field 1440 about remaining programs has an offset value from a start time of the first program to a start time of remaining programs. As described above, the 'StartTime' field 1440 may have a relative time value based on a predetermined point of time; however, the field may have an absolute time value.

An 'EndTime' field 1450 indicates an end time of a corresponding program or an end time of an interval that corresponds to a MPD. In a live streaming service, it is hard to access to a program after the time indicated by the 'EndTime' field 1450 elapses.

The program includes at least one stream and the stream includes at least one segment. According to the exemplary embodiments, the stream may be replaced with 'track' illustrated in FIG. 9.

Figure 15:
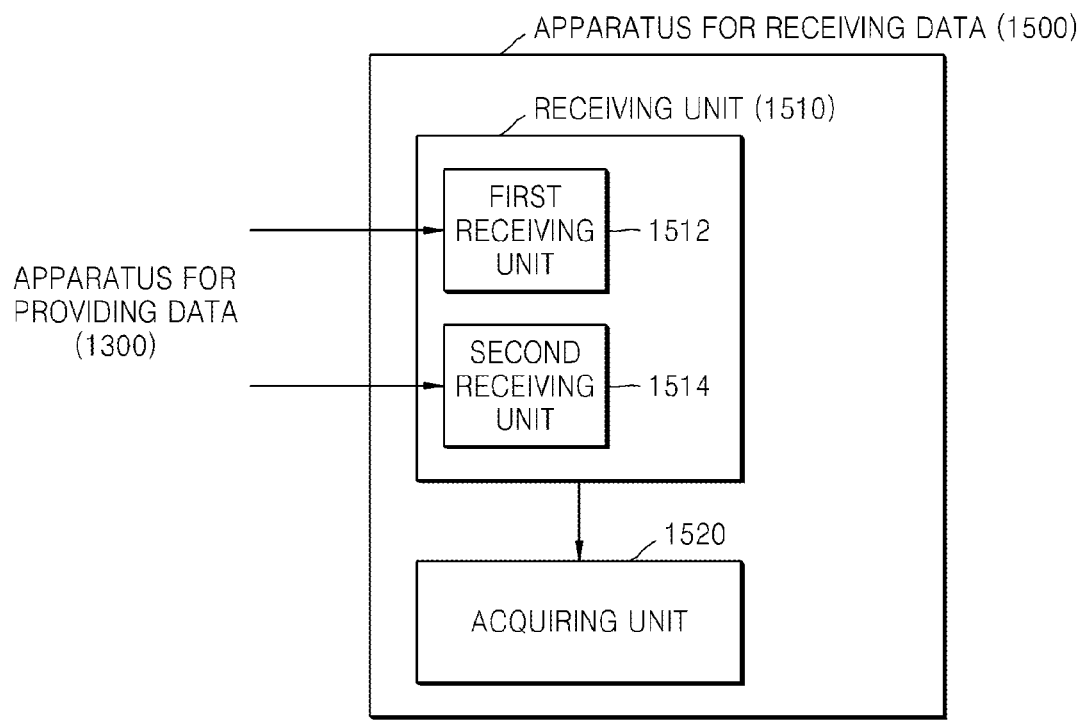
FIG. 15 is a block diagram of an apparatus for receiving data according to an exemplary embodiment.

FIG. 15 is a block diagram of the apparatus 1500 for receiving data according to an exemplary embodiment.

The apparatus 1500 for receiving data according to the current exemplary embodiment includes a receiving unit 1510 and an acquiring unit 1520.

The receiving unit 1510 may include a first receiving unit 1512 and a second receiving unit 1514.

The first receiving unit 1512 receives additional information including information about a plurality of media data. The plurality of media data is generated by encoding the same content in different qualities. The additional information may include access information about the plurality of media data and renewal time information indicating a point of time when the additional information is renewed. Hereinafter, it is assumed that the additional information is a MPD.

The first receiving unit 1512 receives the MPD including information about the plurality of media data.

The second receiving unit 1514 receives at least one of the plurality of media data based on the MPD.

The acquiring unit 1520 acquires at least one of the renewal time information indicating a point of time for the current MPD to be renewed and location information of a next MPD from the MPD.

Hereinafter, operations of the receiving unit 1510 and the acquiring unit 1520 will be described according to time sequence.

The first receiving unit 1512 receives a first MPD including information about a first interval of the plurality of media data.

When a user selects a desired media data from among the plurality of media data, the second receiving unit 1514 requests at least one data selected based on the first MPD to the apparatus 1300 for providing data and receives the requested media data in a live streaming method.

The acquiring unit 1520 acquires the renewal time information from the first MPD. In an exemplary embodiment, the acquiring unit 1520 may further acquire location information of a next MPD.

The first receiving unit 1512 request a second MPD to the apparatus 1300 for providing data based on the renewal time information and receives the second MPD.

A method of renewing the MPD by using the second MPD received from the apparatus 1500 for receiving data may vary.

For example, the apparatus 1500 for receiving data may generate one MPD by accumulating information included in the first MPD and information included in the second MPD and may store the generated MPD in internal database. However, the apparatus 1500 for receiving data may store the first MPD and the second MPD as separate information. In some cases, the first MPD may not be stored.

In another example, the apparatus 1500 for receiving data may extract an attribute from the second MPD and substitute an attribute of the first MPD by using the extracted attribute. Such a method may be efficiently used when the first MPD is compatible with the second MPD.

The second receiving unit 1514 receives at least one media data based on the second MPD.

In order to receive the plurality of media data generated by encoding content to have different qualities, the MPD including information about each of the plurality of media data is needed. When the MPD includes information about all segments constituting the plurality of media data, a size of data increases. In particular, when a user desires some intervals of the media data, information about intervals that a user does not desire becomes dummy data so that a resource is insignificantly wasted and it is hard to search for desired information. Such a problem gets worse when live streaming is provided. In the exemplary embodiments, the MPD only includes information about some intervals of the media data and the renewal time information is inserted into a next MPD so that the apparatus 1500 for receiving data may efficiently acquire a desired MPD.

Hereinafter, various forms of MPDs and a method of processing media data by using a MPD will be described with reference to FIGS. 16 through 27. In FIGS. 16 through 27, the media data is provided in a live streaming method and includes a plurality of programs.

Figure 16:
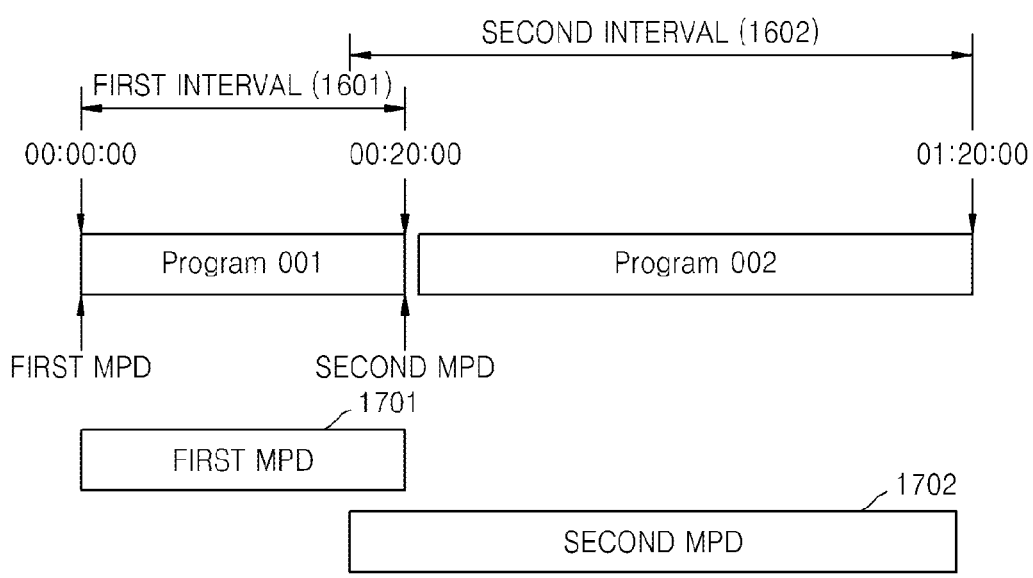
FIG. 16 illustrates an example of a structure of media data according to an exemplary embodiment.

FIG. 16 illustrates an example of a structure of media data according to an exemplary embodiment.

Referring to FIG. 16, the media data includes two programs, wherein a first program is from '00:00:00' to '00:20:00' and a second program is from '00:20:00' to '1:20:00'. The media data is divided into a first interval 1601 and a second interval 1602. The first interval 1601 and the second interval 1602 are not physically divided and are virtually divided according to a range of a MPD. Information about the first interval 1601 is included in a first MPD 1701 illustrated in FIG. 17A and information about the second interval 1602 is included in a second MPD 1702 illustrated in FIG. 17B. In FIG. 16, the MPD is generated in a program unit. Also, the end of each interval is partially overlapped with the start of a next interval. Accordingly, information about a segment included in an overlapped portion is included in both a previous MPD and a next MPD.

FIGS. 17A and 17B respectively illustrate examples of the first and second MPDs 1701 and 1702 including information about the media data of FIG. 16.

FIG. 17A illustrates the first MPD 1701 including information about the first interval 1601.

A 'program id' field indicates that the first MPD 1701 includes information about a program having an ID of '001'.

A 'startTime' field and an 'endTime' field indicate that the program having an ID of '001' starts at '00:00:00' and ends at '00:20:00'.

A 'nextManifest availabilityTime' field indicates that a point of time for the first MPD 1701 to be renewed (that is, a point of time when the second MPD 1702 is to be received) is '00:15:00'. As the 'nextManifest availabilityTime' is '00:15:00', the second MPD 1702 is received before data in the first interval 1601 is completely processed.

An 'URL' field indicates location information of the second MPD 1702. Since the 'URL' field is empty, the first MPD 1701 and the second MPD 1702 have the same attribute and may be acquired through the same URL.

FIG. 17B illustrates the second MPD 1702 including information about the second interval 1602.

A 'program id' field indicates that the second MPD 1702 includes information about a program having an ID of '002'.

A 'startTime' field and an 'endTime' field indicate that the program having an ID of '002' starts at '00:20:00' and ends at '01:20:00'.

A 'nextManifest availabilityTime' field indicates a point of time for a MPD to be renewed. In FIG. 17B, as the 'nextManifest availabilityTime' field does not exist, a next MPD does not exist.

A method of providing the media data to the apparatus 1500 for receiving data by using the first and second MPDs 1701 and 1702 illustrated in FIGS. 17A and 17B is as follows.

i) the apparatus 1500 for receiving data requests the first MPD 1701 to the apparatus 1300 for providing data.

ii) the apparatus 1300 for providing data transmits the first MPD 1701 to the apparatus 1500 for receiving data.

iii) the apparatus 1500 for receiving data requests a segment that forms a first program based on the first MPD 1701.

iv) the apparatus 1300 for providing data transmits the segment that forms the first program to the apparatus 1500 for receiving data.

v) the apparatus 1500 for receiving data requests the second MPD 1702 to the apparatus 1300 for providing data, '00:15:00' after the first program is reproduced.

vi) the apparatus 1300 for providing data transmits the second MPD 1702 to the apparatus 1500 for receiving data.

vii) the apparatus 1500 for receiving data requests a segment that forms a second program based on the second MPD 1702 when the first program is completely reproduced (that is, after '00:20:00').

viii) the apparatus 1300 for providing data transmits the segment that forms the second program to the apparatus 1500 for receiving data.

FIG. 18 illustrates the other example of a structure of media data according to an exemplary embodiment.

Referring to FIG. 18, the media data includes a plurality of programs, wherein a first program is from '00:00:00' to '00:20:00' and a second program is from '00:20:00' to '1:20:00'. The media data is divided into a first interval 1801 and a second interval 1802. The first interval 1801 and the second interval 1802 are not physically divided and are virtually divided according to a range of a MPD. Information about the first interval 1801 is included in a first MPD 1901 illustrated in FIG. 19A and information about the second interval 1802 is included in a second MPD 1902 illustrated in FIG. 19B. In FIG. 18, the MPD is generated in a program unit and the apparatus 1500 for receiving data receives a next MPD including information about a next program after one program is completed.

In FIG. 18, the end of the first interval 1801 does not overlap with the start of the second interval 1802. Accordingly, information about an overlapped segment is not included in the first and second MPDs 1901 and 1902.

FIGS. 19A and 19B respectively illustrate examples of the first and second MPDs 1901 and 1902 including information about the media data of FIG. 18. In FIGS. 19A and 19B, an 'availabiltyTime' field indicates time when the MPD is renewed based on the time when each interval starts.

FIG. 19A illustrates the first MPD 1901 including information about the first interval 1801.

A 'nextManifest availabilityTime' field indicates that a point of time for the first MPD 1901 to be renewed (that is, a point of time when the second MPD 1902 is to be received) is '00:20:00'.

An 'URL' field indicates location information of the second MPD 1902. The second MPD 1902 is acquired by accessing to an URL corresponding to 'Manifest B.xml'.

FIG. 19B illustrates the second MPD 1902 including information about the second interval 1802.

In FIG. 19B, a 'nextManifest availabilityTime' field indicates a point of time for the second MPD 1902 to be renewed based on the time when the second interval 1802 starts. Accordingly, the second MPD 1902 is renewed after '01:00:00' from the starting of the second interval 1802.

According to the exemplary embodiments, the 'nextManifest availabilityTime' field may indicate a point of time for the second MPD 1902 to be renewed based on a point of time when the first program starts. In this case, the 'nextManifest availabilityTime' field is '01:20:00'.

A method of providing the media data to the apparatus 1500 for receiving data by using the first and second MPDs 1901 and 1902 illustrated in FIGS. 19A and 19B is the same as that of FIG. 17 except for V). Accordingly, descriptions of i) through iv) and vi) through vii) are omitted.

When the first program is completed (that is, '00:20:00'), the apparatus 1500 for receiving data requests the second MPD 1902 to the apparatus 1300 for providing data.

Figures 20, 21A:
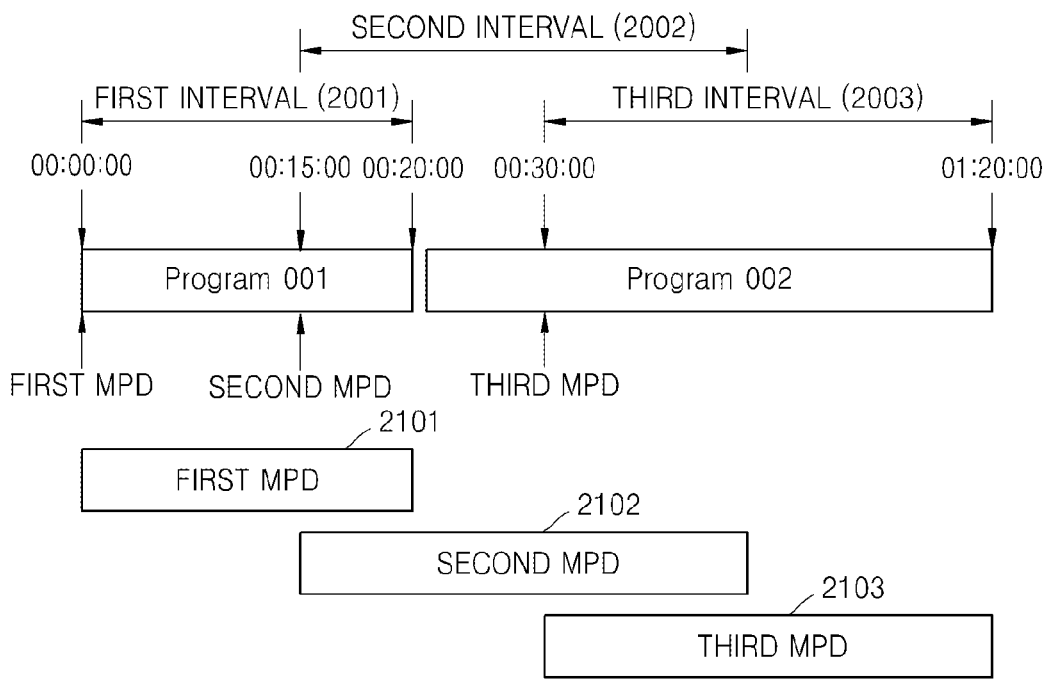

FIG. 20 illustrates the other example of a structure of media data according to an exemplary embodiment.

Referring to FIG. 20, the media data includes two programs, wherein a first program is from '00:00:00' to '00:20:00' and a second program is from '00:20:00' to '1:20:00'. The media data is divided into a first interval 2001, a second interval 2002, and a third interval 2003. Information about the first interval 2001 is included in a first MPD 2101 illustrated in FIG. 21A, information about the second interval 2002 is included in a second MPD 2102 of FIG. 21B, and information about the third interval 2003 is included in a second MPD 2103 of FIG. 21C.

In FIG. 20, the media data is divided into a plurality of intervals according to time regardless of programs and MPDs are generated in each interval. Here, lengths of the intervals are the same as or different from each other. The end of each interval is overlapped with the start of a next interval. Accordingly, information about overlapped segments is included in both a MPD and a next MPD.

FIGS. 21A through 21C respectively illustrate examples of the first, second, and third MPDs 2101, 2102, and 2103 including information about the media data of FIG. 20. In FIGS. 21A through 21C, an 'availabiltyTime' field indicates time when the MPD is renewed based on the time when a first interval in the media data starts.

FIG. 21A illustrates the first MPD 2101 including information about the first interval 2001. In FIG. 21A, as a 'nextManifest availabilityTime' field is '00:15:00', the first MPD 2101 is renewed after '00:15:00' from the starting of the first interval 2001.

FIG. 21B illustrates the second MPD 2102 including information about the second interval 2002. In FIG. 21B, as a 'nextManifest availabilityTime' field is '00:30:00', the second MPD 2102 is renewed after '00:30:00' from the starting of the first interval 2001.

FIG. 21C illustrates the third MPD 2103 including information about the third interval 2003.

A method of providing the media data to the apparatus 1500 for receiving data by using the first and second MPDs 2101, 2102, and 2103 illustrated in FIGS. 21A through 21C is the same as that of FIG. 17. Accordingly, detailed description is omitted.

Figure 22:
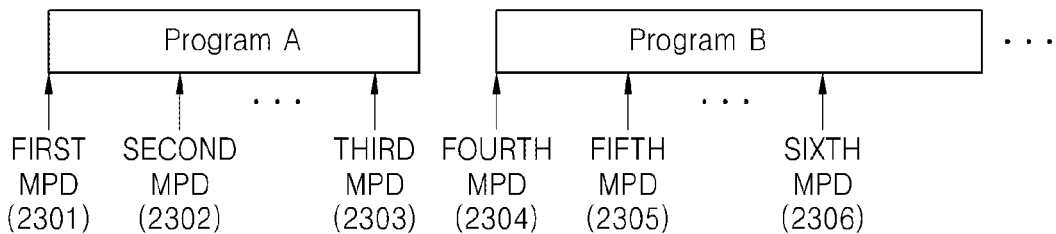
FIG. 22 illustrates a structure of media data according to another exemplary embodiment.

FIG. 22 illustrates the other example of a structure of media data according to an exemplary embodiment.

Referring to FIG. 22, the media data includes a plurality of programs, wherein a first program is from '00:00:00' to '00:20:00' and a second program is from '00:20:00' to '1:20:00'. The media data is divided into a plurality of sections each having predetermined time intervals. MPDs corresponding to each interval are generated.

In FIG. 22, the media data is divided into a plurality of intervals according to time regardless of programs and MPDs are generated in each interval. Also, overlapping does not exist in the intervals, and information about a segment included in a previous MPD does not overlap with information about a segment included in a next MPD.

The MPDs and the programs may be aligned. For example, the start of a second program may be matched with a point of time when a fourth MPD 2304 is received so as to appropriately manage even though a first program and a second program are encoded differently.

Figure 23A:
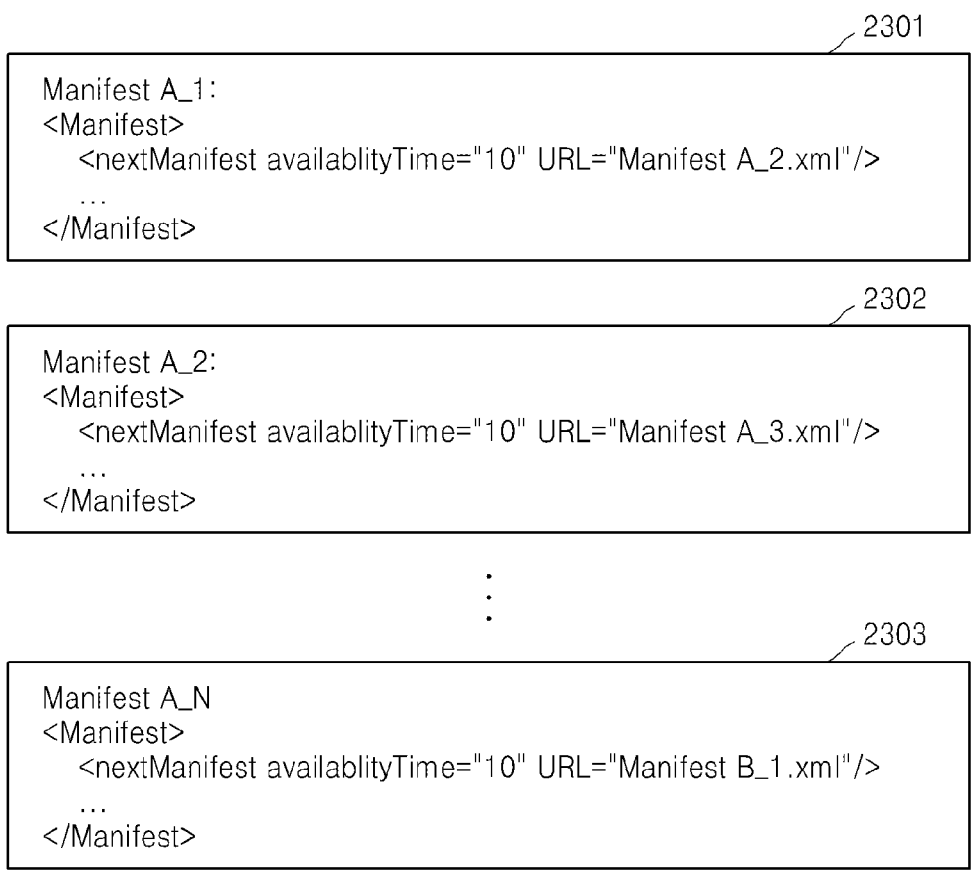
FIGS. 23A and 23B illustrate exemplary embodiments of MPDs including information about the media data of FIG. 22.
Figure 23B:
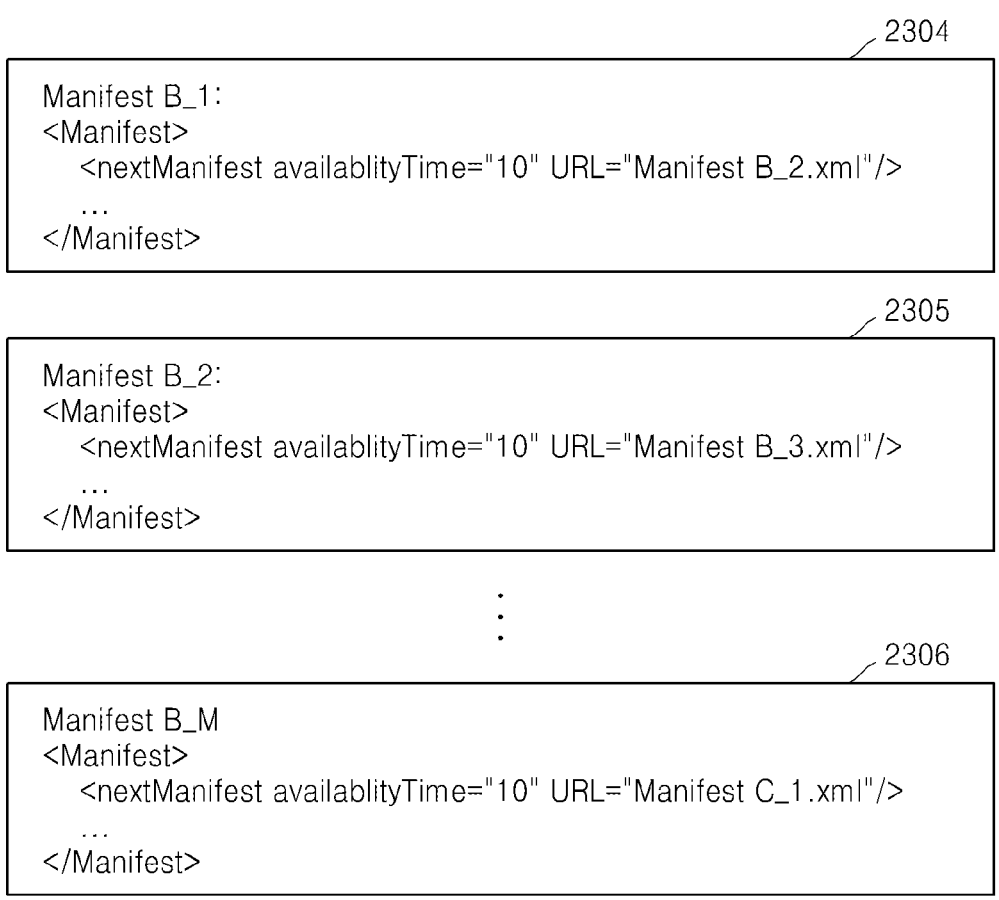

FIGS. 23A and 23B illustrate examples of first through sixth MPDs 2301 through 2306 including information about the media data of FIG. 22. In FIGS. 23A and 23B, an 'availabiltyTime' field indicates a number of segments downloaded until the MPD is renewed after each interval starts.

FIGS. 23A and 23B illustrate the first through sixth MPDs 2301 through 2306 including information about segments in corresponding intervals.

A first program is processed by the first MPD 2301 through the third MPD 2303 and a point of time for the previous MPD to be renewed to the next MPD is represented by using a segment count.

A second program is processed by the fourth MPD 2304 through the sixth MPD 2306 and a point of time for the previous MPD to be renewed to the next MPD is represented by using a segment count.

In FIGS. 23A and 23B, a 'nextManifest availabilityTime' field indicates a point of time for the MPD to be renewed based on a point of time when a corresponding interval starts. When the 'nextManifest availabilityTime' is '10', the number of segments corresponding to '10' are downloaded from a starting point of each interval and then a next MPD is received for processing segments in a next interval.

A method of providing the media data to the apparatus 1500 for receiving data by using the first through sixth MPDs 2301 through 2306 illustrated in FIGS. 23A and 23B is the same as that of FIG. 17 except for the number of renewing the MPDs. Accordingly, detailed description is omitted.

Figure 24:
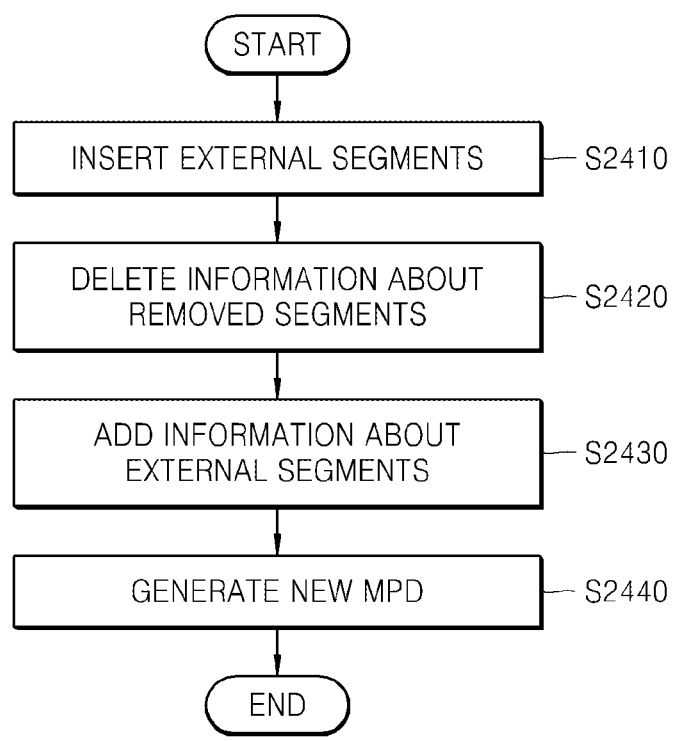
FIG. 24 is a flowchart illustrating a process of changing a MPD in the apparatus for providing data of FIG. 13 according to an exemplary embodiment.

FIG. 24 is a flowchart illustrating a process of changing a MPD in the apparatus 300 for providing data according to an exemplary embodiment.

When segments are prepared, the apparatus 300 for providing data generates a MPD including information about the prepared segments is generated. Accordingly, content of a program provided from the apparatus 300 for providing data is changed, the MPD may be changed. For example, when a commercial is inserted into a program, the type, order, and synchronization of segments that the MPD covers are changed and thus the MPD is also changed. In FIG. 24, as a commercial is inserted into the program, the generated MPD is changed. The media data includes a first interval and a second interval. Information about the first interval is included in a first MPD and information about the second interval is included in a second MPD. Also, it is assumed that the first and second MPDs include location information.

In operation S2410, external segments are inserted into a desired interval. For example, the external segments are inserted into the first interval.

In operation S2420, information about segments excepting from the first interval is deleted in the first MPD. When the external segments are newly inserted into the first interval while the length of the first interval is fixed, existing segments are removed by the number of the inserted external segments from the first interval. Accordingly, information about the segments excepting from the first interval is deleted in the first MPD In operation S2430, information about the external segments is added to the first MPD and location information about a next MPD is changed. That is, an 'URL' of a next MPD in the first MPD is changed from an URL of the second MPD to an URL of a third MPD.

In operation S2440, the third MPD including information about the segments excepting from the first interval is generated.

Figure 25:
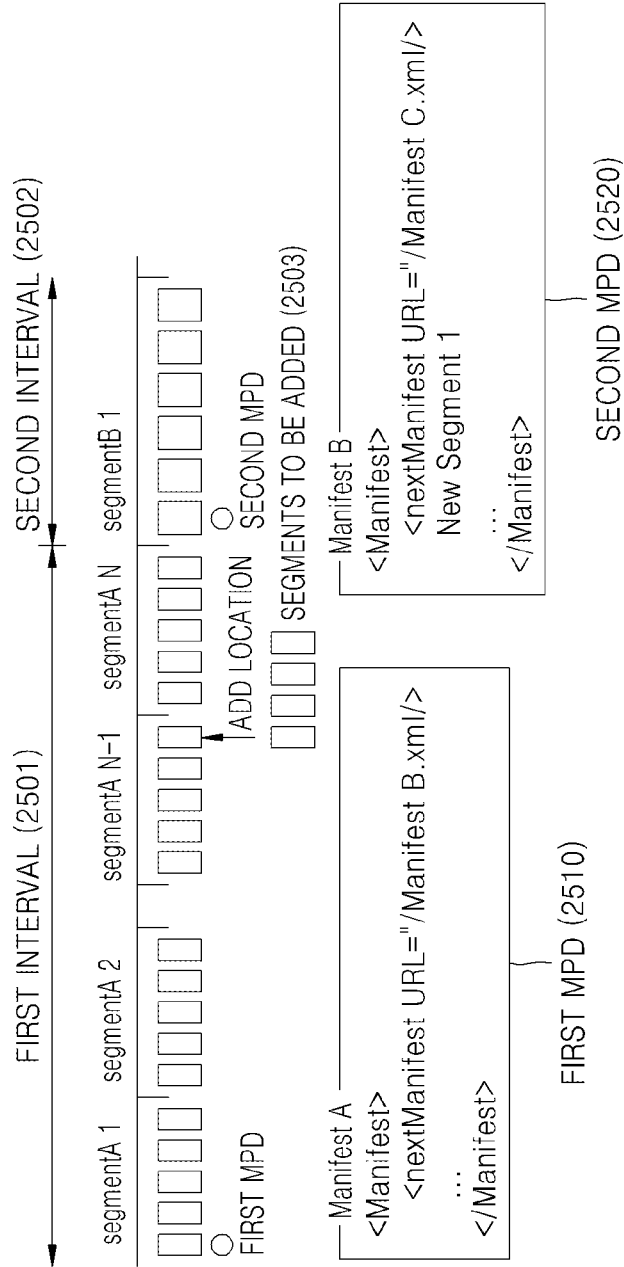
FIG. 25 illustrates MPDs before additional segments are inserted in the apparatus for providing data of FIG. 13 according to an exemplary embodiment.

FIG. 25 illustrates first and second MPDs 2510 and 2520 before additional segments 2503 are inserted in the apparatus 1300 for providing data according to an exemplary embodiment.

The media data is divided into a first interval 2501 and a second interval 2502.

The first MPD 2510 includes information about segments in the first interval 2501, renewal time information indicating a point of time for the second MPD 2520 to be received, and location information of the second MPD 2520.

The second MPD 2520 includes information about segments in the second interval 2502 and location information of a next MPD.

As such, while the first MPD 2510 and the second MPD 2520 are generated, the additional segments 2503 such as a commercial may be inserted into the first interval 2501 and a change in the MPDs due to the insertion of the additional segments 2503 will be described with reference to FIG. 26.

Figure 26:
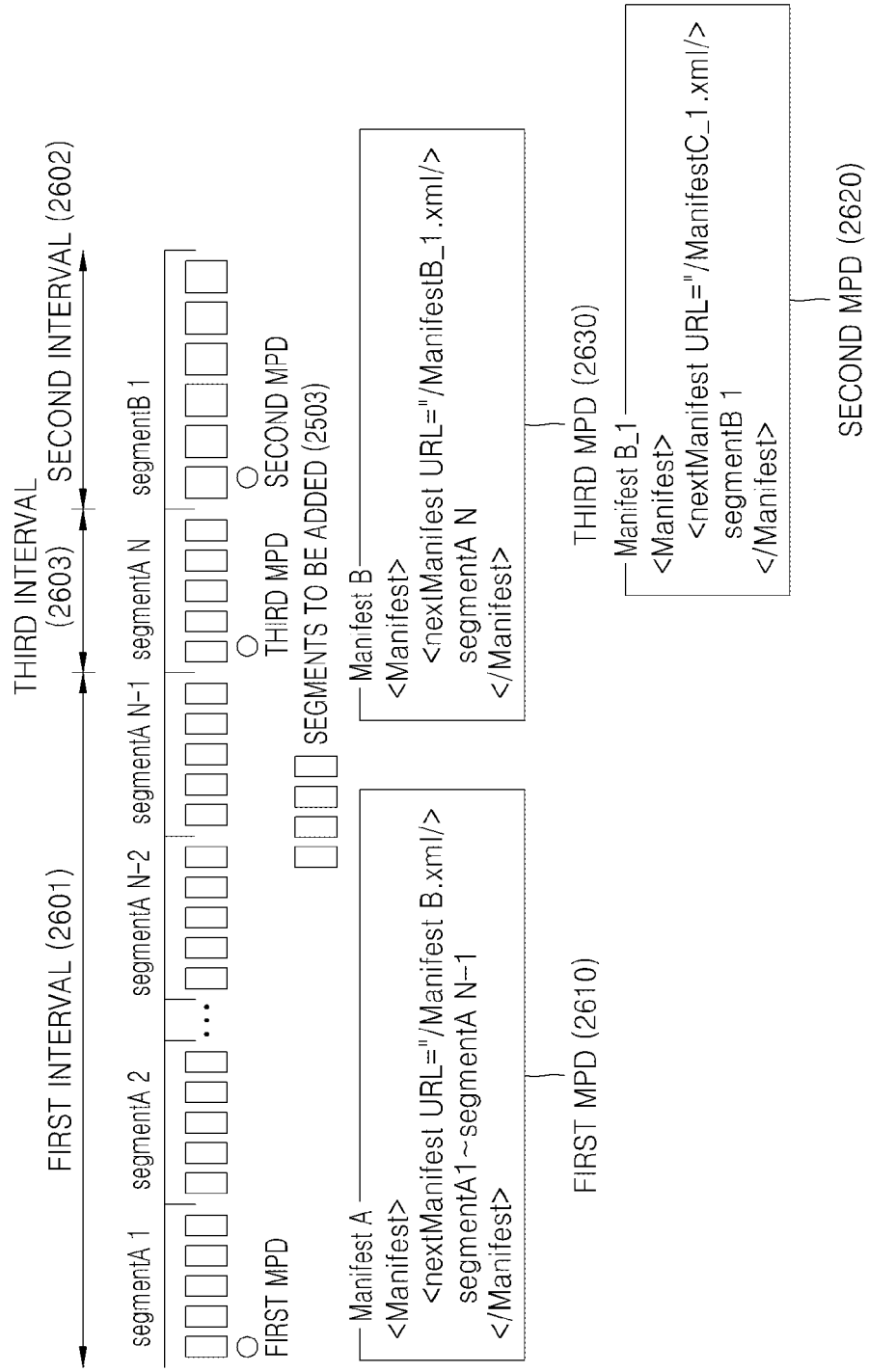
FIG. 26 illustrates MPDs after additional segments are inserted in the apparatus for providing data of FIG. 13 according to an exemplary embodiment.

FIG. 26 illustrates first, second, and third MPDs 2610, 2620, and 2630 after the additional segments 2503 are inserted in the apparatus 1300 for providing data of according to an exemplary embodiment.

When the additional segments 2503 are inserted into the first interval 2501, existing segments included in the first interval 2501 are partially removed from the first interval 2501.

In the apparatus 1300 for providing data, information about the additional segments 2503 is inserted into the first MPD 2510 and information about removed segments 2603 is deleted so that a new first MPD 2610 is generated.

Next, in the apparatus 1300 for providing data, a third MPD 2630 including information about the removed segments 2603 is generated.

The first MPD 2610 includes location information about the third MPD 2630 and the third MPD 2630 includes location information about a second MPD 2620.

Figure 27:
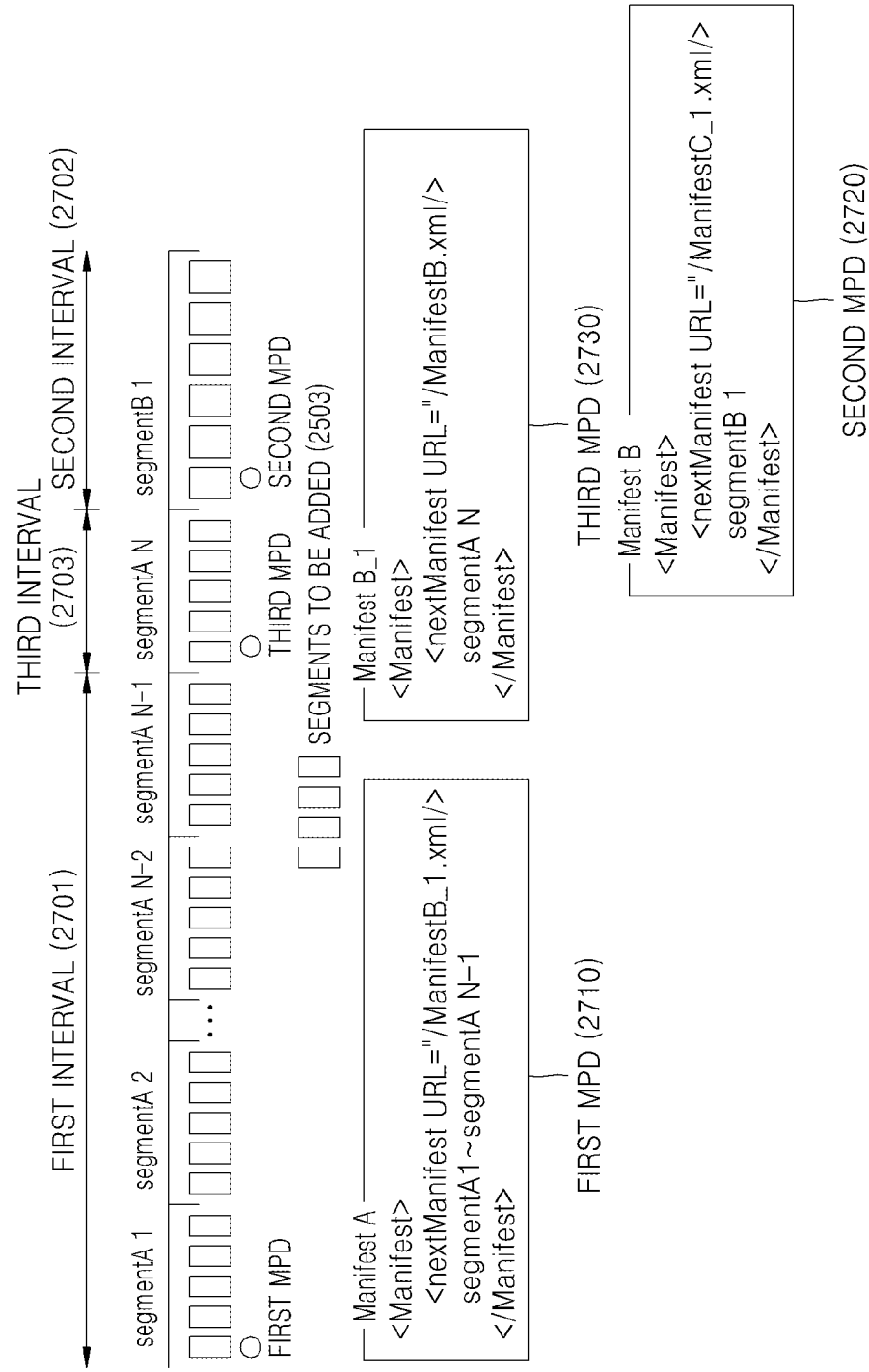
FIG. 27 illustrates MPDs after additional segments are inserted in the apparatus for providing data of FIG. 13 according to another exemplary embodiment.

FIG. 27 illustrates the other example of first, second, and third MPDs 2710, 2720, and 2730 after additional segments 2503 are inserted in the apparatus 1300 for providing data according to an exemplary embodiment.

Unlike FIG. 26, the name of the second MPD 2520 is not changed in FIG. 27.

As the additional segments 2503 are inserted into the first interval 2501, some of the existing segments included in the first interval 2501 are removed from the first interval 2501.

In the apparatus 1300 for providing data, information about the additional segments 2503 is inserted into the first MPD 2510 and information about the removed segments 2603 is deleted so that the new first MPD 2710 is generated.

Next, in the apparatus 1300 for providing data, the third MPD 2730 including information about removed segments 2703 is generated. Here, in order to not change location information about a next MPD included in the first MPD 2710, the name of the third MPD 2730 is determined as 'manifest B.xml'.

Finally, the name of the second MPD 2720 is changed to 'manifest B_1.xml'.

Figure 28:
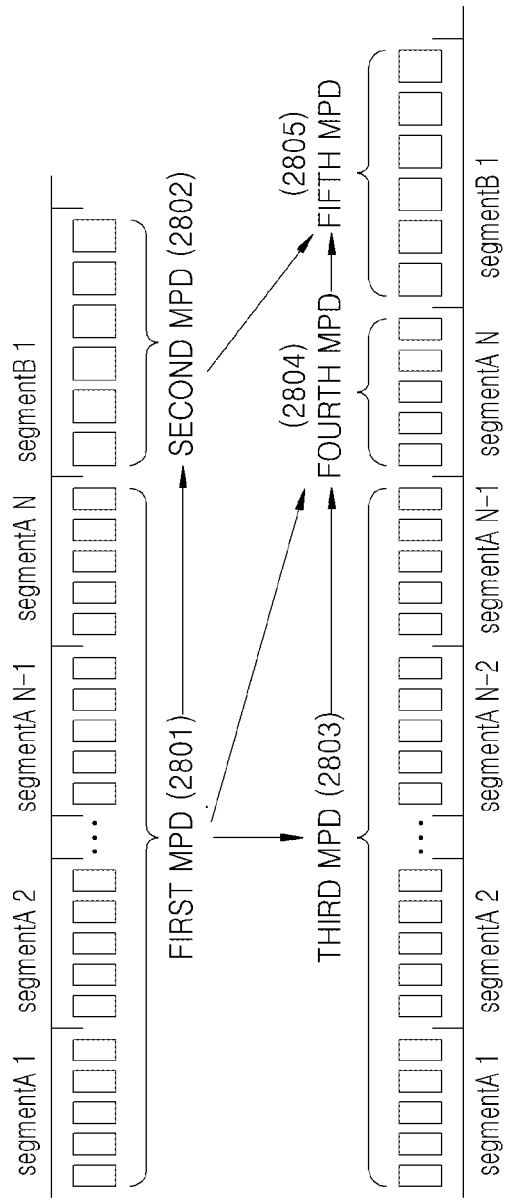
FIG. 28 illustrates a change in MPDs according to insertion of additional segments in the apparatus for providing data of FIG. 13 according to an exemplary embodiment.

FIG. 28 illustrates a change in the first through fifth MPDs 2801 through 2805 according to insertion of additional segments in the apparatus 1300 for providing data according to an exemplary embodiment.

The first MPD 2810 corresponding to a first interval 2801 and the second MPD 2820 corresponding to a second interval 2802 are generated and then additional segments are inserted into the first interval 2801.

Information about the additional segments is inserted into the first MPD 2810 and information about removed segments is removed. At the same time, the third MPD 2830 including information about the removed segments is generated and a name of the third MPD 2830 is determined as 'manifest B'. Here, a name of a next MPD is determined as 'manifest B_1.xml'.

A name of the second MPD 2820 is changed from 'manifest B.xml' to 'manifest B_1.xml'.

Figure 29A:
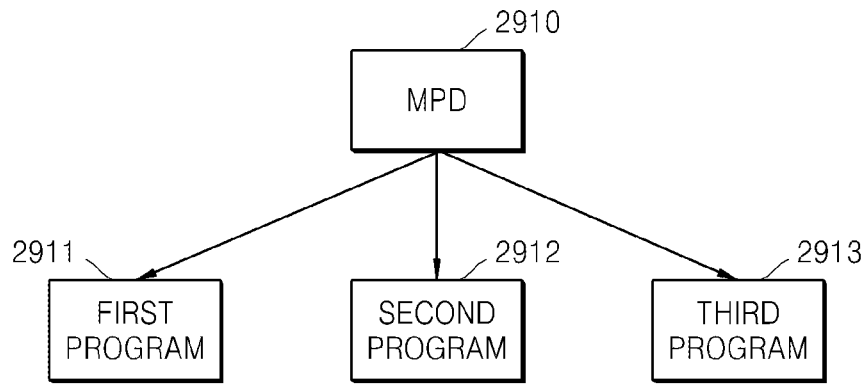
FIGS. 29A through 29C are block diagrams illustrating the relationships between MPDs and programs according to exemplary embodiments.
Figure 29B:
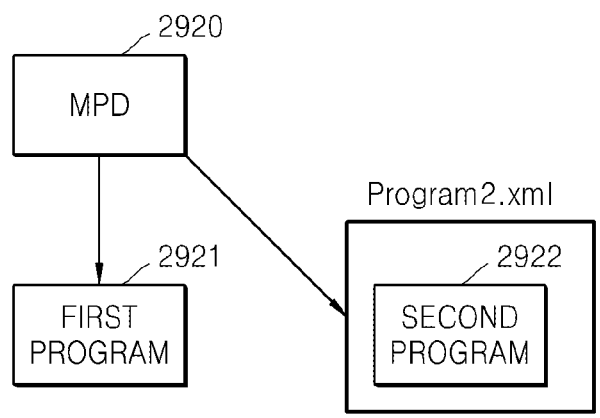
Figure 29C:
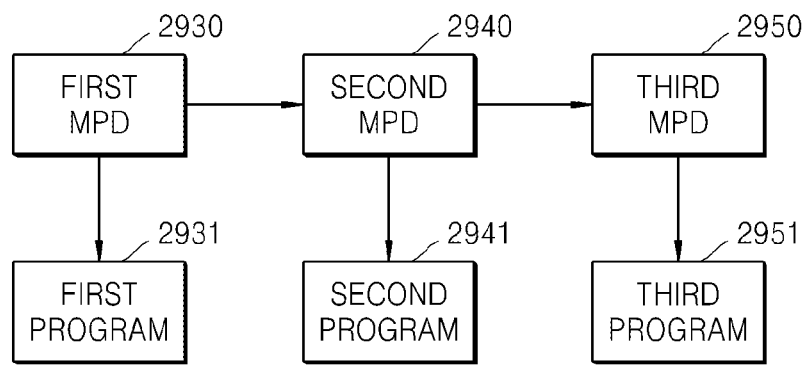

FIGS. 29A through 29C are block diagrams illustrating the relationships between MPDs and programs according to the exemplary embodiments.

In FIG. 29A, one MPD 2910 includes information about a plurality of first through third programs 2911, 2912, 2913. An interval covered by the MPD includes a part of or all of the first through third programs 2911, 2912, and 2913. For example, in live streaming, media data in a program unit is generated in real time and MPDs may be generated in a program unit. Here, the MPD includes information about all media data corresponding to past and future programs and thus data processing capabilities may be improved.

In FIG. 29B, a MPD 2920 includes location information of a predetermined program 2922. The MPD 2920 includes an URL field and may indicate location of a next MPD by using the URL field, as described above. However, as illustrated in FIG. 29B, the URL field included in the MPD 2920 is used to indicate location of the predetermined program 2922 instead of location of a next MPD. The predetermined program 2922 indicated by the URL field may be a first program covered by a next MPD, a last program covered by the current MPD 2920, or a program that satisfies the previously defined condition.

In FIG. 29C, one MPD includes information about one program and information about a next program.

A first MPD 2930 includes information about a first program 2931 and location information of a second MPD 2940 as a next MPD.

The second MPD 2940 includes information about a second program 2941 and location information about a third MPD 2950, as a next MPD.

Similarly, a third MPD 2950 includes information about a third program 2951.

Figure 30:
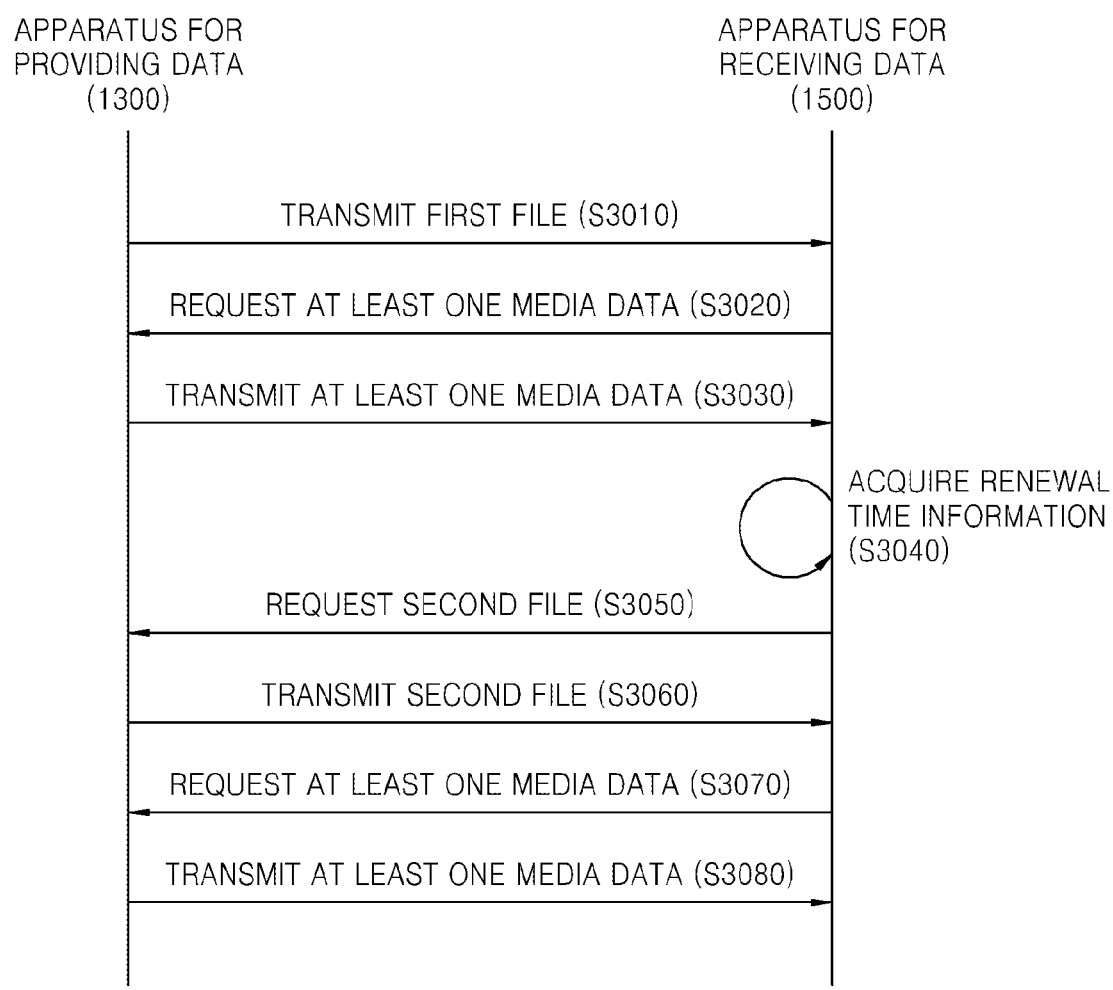
FIG. 30 is a flowchart illustrating a data flow between the apparatus for providing data of FIG. 13 and the apparatus for receiving data of FIG. 15.

FIG. 30 is a flowchart illustrating a data flow between the apparatus 1300 for providing data and the apparatus 1500 for receiving data.

In operation S3010, the apparatus 1300 for providing data transmits first additional information including information about a first interval of a plurality of media data. The plurality of media data is generated by encoding content in different qualities.

In operation S3020, the apparatus 1500 for receiving data requests to transmit at least one media data based on the first additional information. The media data may include at least one segment which may be switched with other media data, and processed and reproduced. The first additional information includes access information about segments included in the first interval and thus the apparatus 1500 for receiving data may request to transmit desired media data based on the first additional information.

In operation S3030, the apparatus 1300 for providing data transmits at least one media data.

In operation S3040, the apparatus 1500 for receiving data acquires renewal time information, indicating a point of time for the additional information to be renewed, from the additional information.

In operation S3050, the apparatus 1500 for receiving data requests second additional information including information about a second interval of the plurality of media data based on the renewal time information.

In operation S3060, the apparatus 1300 for providing data transmits the additional information.

In operation S3070, the apparatus 1500 for receiving data renews additional information by using the second additional information and requests to transmit at least one media data.

A method of renewing additional information executed by the apparatus 1500 for receiving data may vary.

For example, the apparatus 1300 for providing data may generate the first additional information and the second additional information having the same attribute structure and different attribute values. In this case, the first additional information is compatible with the second additional information (for example, number of segments, list of segments, and location information of the additional information are the same) so that the second additional information may be immediately used without synchronizing the second additional information with the first additional information.

In another example, the apparatus 1300 for providing data may generate the first additional information and the second additional information having different attribute structures. In this case, the first additional information may include location information of the second additional information.

In operation S3080, the apparatus 1300 for providing data transmits at least one media data.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media (e.g., transmission through the Internet).

While exemplary embodiments have been particularly shown and described above, it will be understood by those of ordinary skill in the art that various changes in form and details may be made therein without departing from the spirit and scope of the exemplary embodiments as defined by the following claims.

What is claimed is:

1. A method of receiving a content, the method comprising:
   receiving a file including attribute information about a plurality of media data, identifiers of a plurality of segments of each of the plurality of media data, renewal time information of an external file and location information of the external file, wherein the plurality of media data are different encoded versions of the content and the renewal time information indicates a time when the file is to be updated;
   requesting a segment of selected media data among the plurality of media data by transmitting a request including an identifier of the segment based on the file, wherein each of the plurality of media data is divided into the plurality of segments based on a time;
   receiving the segment in response to the request;
   identifying the renewal time information and the location information of the external file based on the file;

receiving the external file of a plurality of external media data;

merging the attribute information about the plurality of external media data into the file;

receiving an external segment included in one of the plurality of external media data based on the merged file.

2. The method of claim 1, wherein the external file has the same attribute structure as the file.

3. The method of claim 1, wherein the external file has a different attribute structure from the file.

4. The method of claim 1, wherein the plurality of media data and the plurality of external media data are classified according to programs to be provided by a first interval and a second interval.

5. The method of claim 4, wherein the first interval and the second interval are generated by dividing the content into predetermined time units.

6. The method of claim 4, wherein the file further comprises information indicating a starting point of the first interval.

7. The method of claim 4, wherein the file further comprises information indicating an end point of the first interval.

8. The method of claim 1, wherein the file further comprises identification information of programs provided from the plurality of media data.

* * * * *